March 17, 1936. E. E. HEWITT 2,034,296
FLUID PRESSURE BRAKE
Filed June 20, 1931 3 Sheets-Sheet 1
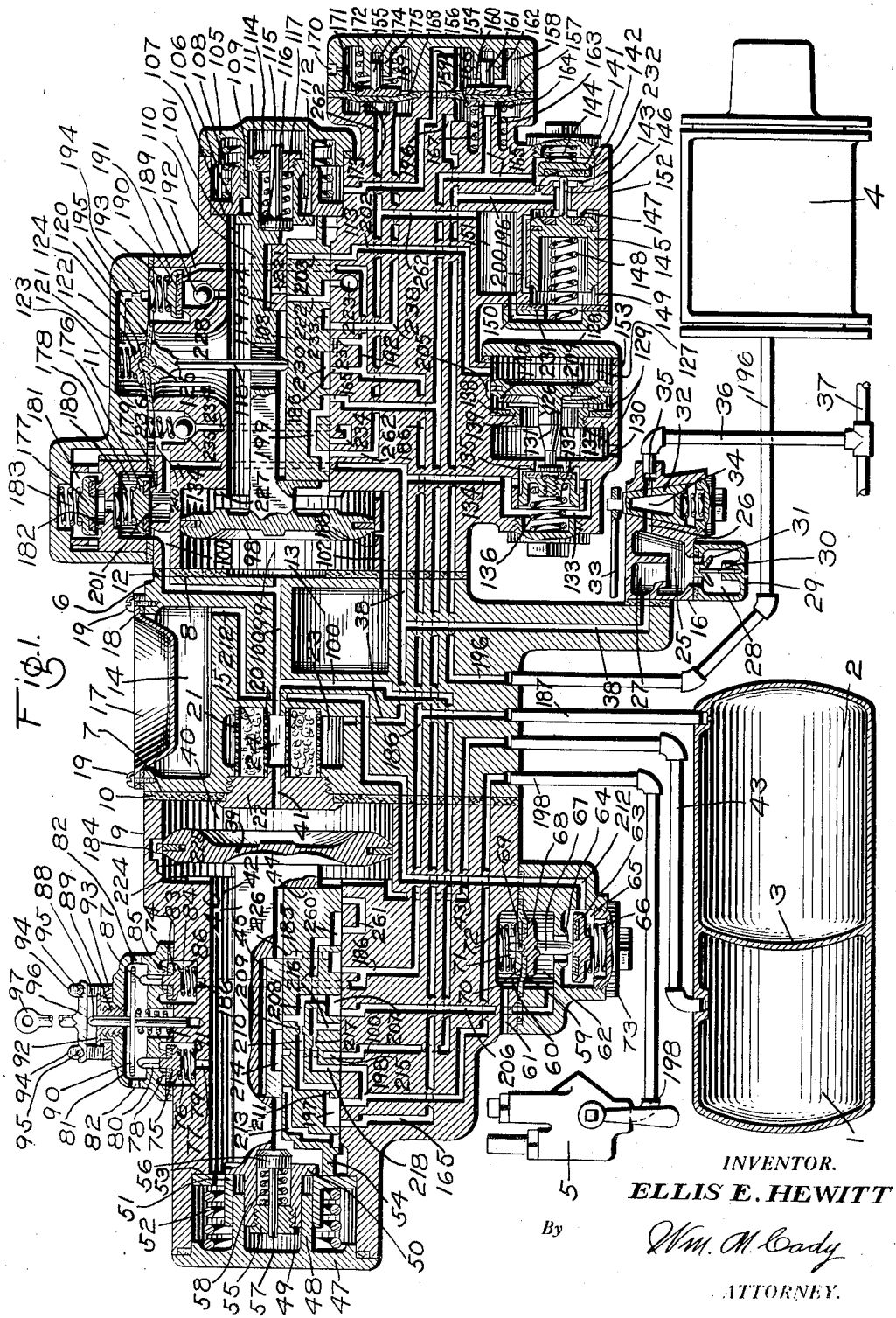
INVENTOR.
ELLIS E. HEWITT
By Wm. M. Cady
ATTORNEY.

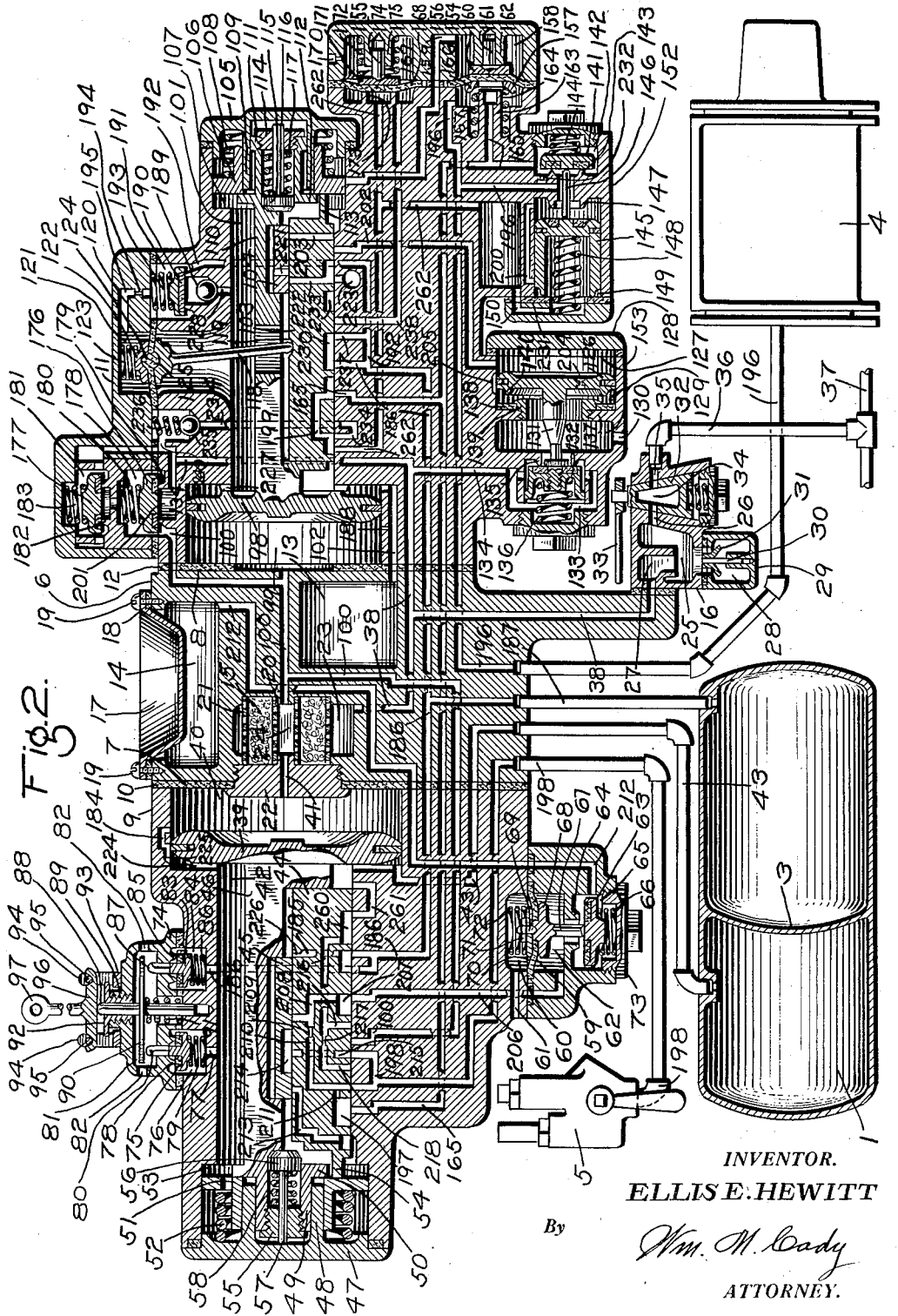

March 17, 1936.  E. E. HEWITT  2,034,296
FLUID PRESSURE BRAKE
Filed June 20, 1931  3 Sheets-Sheet 3
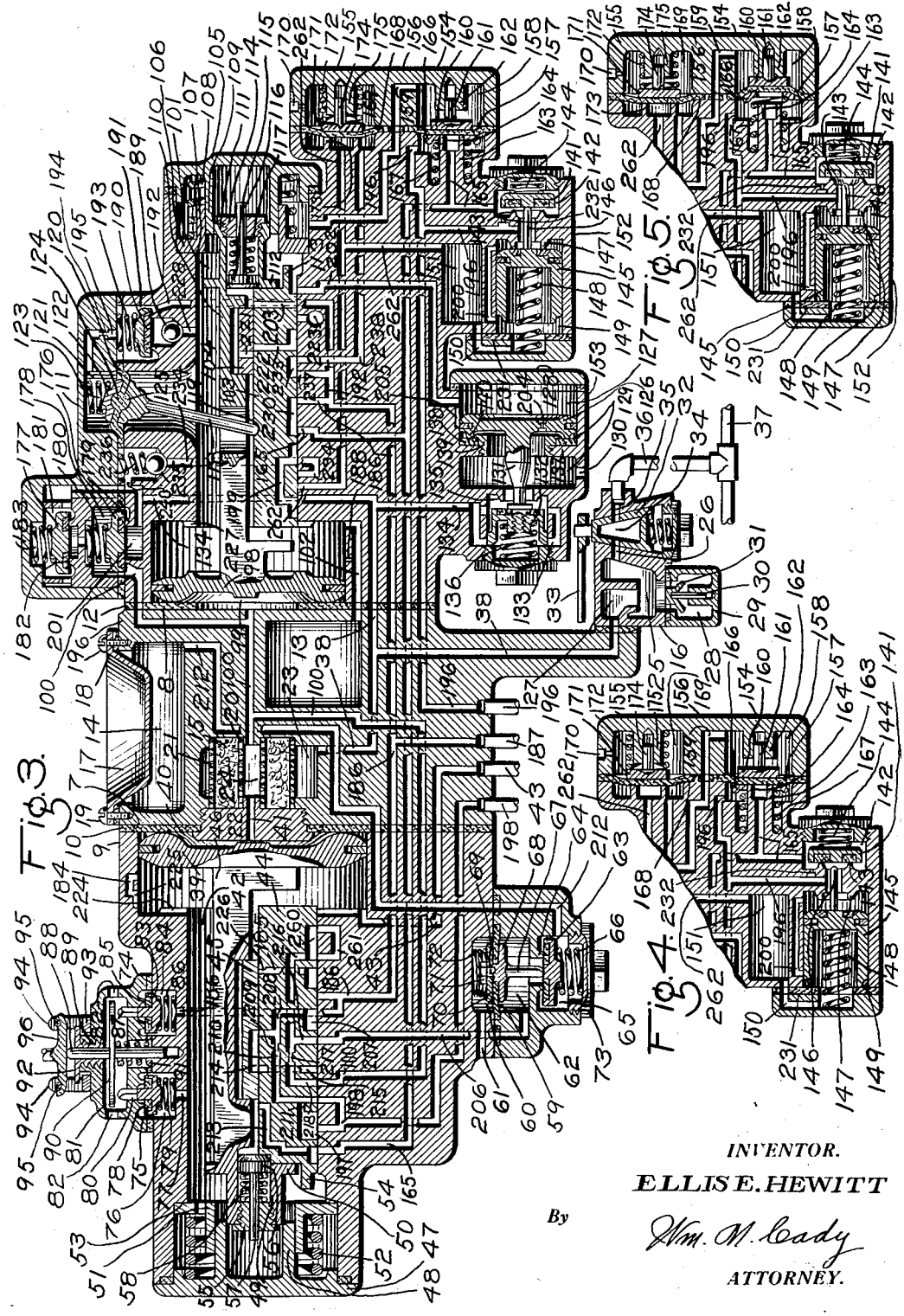
INVENTOR.
ELLIS E. HEWITT
By
Wm. M. Cady
ATTORNEY.

Patented Mar. 17, 1936

2,034,296

UNITED STATES PATENT OFFICE 2,034,296

FLUID PRESSURE BRAKE

Ellis E. Hewitt, Edgewood, Pa., assignor to The Westinghouse Air Brake Company, Wilmerding, Pa., a corporation of Pennsylvania Application June 20, 1931, Serial No. 545,647

38 Claims. (Cl. 303—46)

This invention relates to fluid pressure brakes and more particularly to the type adapted to operate in accordance with variations in brake pipe pressure.

For the purpose of economy, there is a continuing tendency to increase the number of freight cars hauled in a train and where heretofore a freight train might consist of 100 cars, it is now desired to operate trains which include up to 150 cars.

The brake equipment at present employed was originally designed to operate in trains of up to 100 cars, but with the continuing increase in train length various operating difficulties are being encountered and especially in obtaining the intended operation of the equipment at the rear end of a long train.

One object of my invention is to provide an improved fluid pressure brake equipment of the above type for obviating the difficulties encountered in long train operation.

Other objects and advantages will appear in the following, more detailed description of the operation of the invention.

In the accompanying drawings; Fig. 1 is a diagrammatic view, mainly in section, of an improved brake controlling valve device embodying my invention and showing the various portions in the normal or release position; Fig. 2 is a diagrammatic view, mainly in section, of the improved brake controlling valve device showing the various portions in the position which they assume at the head end of a train upon a release of the brakes; Fig. 3 is a diagrammatic view, mainly in section, of the brake controlling valve device with the various portions shown in emergency application position, the position of the triple valve device being also that assumed when a service application of the brakes is effected; Fig. 4 is a diagrammatic view of a part of the emergency valve portion of the brake controlling valve device showing the parts in one position, which is assumed when an emergency application of the brakes is effected; and Fig. 5 is a view similar to Fig. 4 but with the parts in another position which will be assumed at a later time when an emergency application of the brakes is effected.

As shown in the drawings, the fluid pressure brake equipment comprises a brake controlling valve device, an auxiliary reservoir 1 and emergency reservoir 2, preferably formed in a single casing having a partition wall 3 separating said reservoirs from each other, a brake cylinder 4, and a retaining valve device 5.

The brake controlling valve device comprises a pipe bracket portion 6 having two gasket faces 7 and 8 preferably disposed opposite each other. A service application valve or triple valve device 9 is secured to the face 7 and a gasket 10 is interposed between said valve and face, and an emergency application valve device 11 is secured to the face 8 with a gasket 12 interposed between said face and said emergency application valve device.

One feature of the invention is that the pipe bracket portion 6, to which all pipe connections are made, contains a quick action chamber or reservoir 13, a quick service bulb or reservoir 14 and a strainer device 15 and has a face upon which is mounted a combined dirt collector and cut-out valve device 16. The quick service reservoir 14 is formed by a cavity in the pipe bracket, one side of said cavity being closed by a removable cover plate 17. The cover plate 17 is dish-shaped, being provided with a concavity surrounded by a flange 18 adapted to be secured to the casing by a plurality of cap screws 19. The concave portion of the cover plate is adapted to be either inserted into the cavity of the pipe bracket for providing a quick service reservoir 14 of one volume or the cover plate may be turned over so that the volume within the concave portion of the cover plate is added to the volume of the cavity in the pipe bracket, thereby providing a quick service reservoir 14 of another or greater volume.

The strainer device 15 comprises an inner ring-shaped, perforated retainer 20 and an outer ring-shaped, perforated retainer 21 concentrically mounted in the casing and held in place by a nut 22 having screw-threaded engagement in the casing. Hair or other suitable material is packed into the space between the retainers 20 and 21 and is adapted to remove impurities from the air which is supplied to the annular chamber 23 surrounding the retainer 20 and which flows from chamber 23 through the strainer to passage 24 within the inner retainer 20.

The combined centrifugal dirt collector and cut-out cock 16 is preferably mounted directly on the pipe bracket and comprises the usual dirt separating chamber 25 having an inlet passage 26 in one side and an outlet passage 27 from near the center of said chamber and below the inlet passage 26. The lower end of the dirt separating chamber 26 is open to a chamber 28 contained in a removable member 29, and foreign matter separated from the air stream which passes through chamber 25 is adapted to fall into and collect in chamber 28. The member 29 is provided with an upwardly projecting pin 30 having loosely mounted thereon a check valve 31 for closing communication from chamber 28 to chamber 25 upon a sudden reduction in pressure in chamber 25.

The cut-out valve which is preferably associated with the centrifugal dirt collector comprises a plug valve 32 rotatably mounted in the casing and adapted to be turned from the cut-in position shown in the drawings to a cut-out position by means of a handle 33. The plug valve 32 is provided with a through opening 34 adapted in the cut-in position to connect passage 26 leading to the centrifugal dirt collector to a passage 35 leading through pipe 36 to the usual brake pipe 37. The brake pipe 37 is thus connected through the combined cut-out valve and centrifugal dirt collector 16 to a brake pipe passage 38 in the pipe bracket portion 6, which passage leads to the annular chamber 23 around the strainer device 15, and to the gasket face 8. When the cut-out plug valve 32 is turned by the handle 33 to cut-out position, communication between passages 35 and 26 is interrupted.

The service application valve device 9 comprises a piston 39 having at one side a chamber 40 which is open to the brake pipe passage 38 in the pipe bracket portion through an aperture 41 in the nut 22, passage 24 in the strainer device 15, through said strainer device and the annular chamber 23. Said piston has at the opposite side a valve chamber 42 in constant communication with the auxiliary reservoir 1 through passage and pipe 43 and containing a main slide valve 44 and an auxiliary slide valve 45 adapted to be operated by said piston.

The service application piston 39 is provided with a stem 46 having a recess adapted to operatively receive the auxiliary slide valve 45. A portion of valve chamber 42, at the left hand end, is of enlarged diameter and is closed by a cover plate 47, which is provided with a projection 48 extending into said chamber. The projection 48 is provided with a bore for slidably receiving the end portion 49 of the piston stem 46. A collar or operating lug 50 is formed on the piston stem 46 adjacent the end portion 49, and the right hand side of this lug is adapted to engage the main slide valve 44 for moving said slide valve. The left hand side of said lug is adapted to engage a retarded release device comprising a member 51 movably mounted on the exterior surface of projection 48, and a spring 52 interposed between said member and the cover plate 47. Inward movement of said member by said spring is adapted to be limited by a shoulder 53 formed in the valve chamber 42. The main slide valve 44 is provided with a finger 54 preferably adapted to engage the member 51 at the same time as the operating lug 50 on the piston stem engages said member.

The end portion 49 of the piston stem 46 is provided with a bore, the left hand end of which is closed by a screw plug 55. Said bore is offset from the center line of the piston stem and the lower portion of said bore at the right hand end is open to the valve chamber 42. Said bore contains a plunger 56 having a stem 57 slidably extending through a bore in the screw plug 55, and a spring 58 is interposed between said screw plug and plunger and normally maintains said plunger in engagement with the stem 46.

Preferably associated with said service application valve device is a quick service modifying valve device 73 comprising a casing secured to a suitable face of the service application valve device casing. A flexible diaphragm 59 is suitably mounted between said casings and has a chamber 60 at one side open to the atmosphere through a passage 61, and a chamber 62 at the opposite side. Said diaphragm carries an operating pin 67 which is adapted to engage and move a poppet valve 63 away from a seat rib 64, said poppet valve being contained in a chamber 65 and subject to the pressure of a spring 66. The operating pin 67 has an enlarged head portion 68 engaging one side of the diaphragm 59 and a central stud portion 69 extending through said diaphragm. A clamping ring 70 is mounted on the diaphragm over the stud portion 69 and a nut 71 is screw-threaded on to the stud portion 69 for clamping the diaphragm between the pin head 68 and the ring 70. A spring 72 is interposed between the ring and the wall of chamber 60 and is adapted to urge said diaphragm downwardly for unseating the poppet valve 63.

Preferably mounted on another face of the casing of the service application valve device is a reservoir release valve device 74 operative manually to vent fluid under pressure from the auxiliary reservoir 1 and from the emergency reservoir 2.

The reservoir release valve device comprises an auxiliary reservoir release valve 75 contained in a chamber 76 which is open to valve chamber 42 through a passage 77. Said valve is adapted to be normally held in engagement with a seat rib 78 by the pressure of a spring 79 and is provided with a fluted stem 80 slidably extending through a suitable bore in the casing and into chamber 81, which is open to the atmosphere through a plurality of passages 82. An emergency reservoir release valve 83 is contained in a chamber 84 and is adapted to be normally held in engagement with a seat rib 85 by the pressure of a spring 86. Said valve has a fluted stem 87 slidably extending through a suitable bore in the casing and into the atmospheric chamber 81, said stem 87 being shorter in length than the stem 80 of the auxiliary reservoir release valve 75. One end of a sliding pin 88 is disposed in a bore in the casing of the service application valve device, while the other end extends through a bore in a clamping nut 89 having screw-threaded engagement in the release valve casing. Disposed in the atmospheric chamber 81 and carried by the pin 88 is a member 90 which, when the pin 88 is moved downwardly in a manner to be hereinafter explained, is adapted to first engage the auxiliary reservoir release valve stem 80 so as to move the valve 75 away from seat rib 78. Upon further downward movement, the member 90 is adapted to engage the shorter stem 87 of the emergency reservoir release valve 83 and move said valve away from the seat rib 85, such downward movement of member 90 being opposed by the pressure of a spring 91.

Mounted between the reservoir release valve casing and a flange 92 on the clamping nut 89 is a carrier device 93 having projections 94, each of which is provided near its end with a combined retaining and fulcrum pin 95. Disposed between the upper end of the operating pin 88 and the fulcrum pins 95 is a lever 96 provided at each end with a recess for engaging the respective pin 95. The pressure of spring 91 acting through the operating pin 88 normally holds the lever 96 in engagement with the pins 95. The lever 96 is provided with an operating lever 97, which, when moved either to the left or to the right, fulcrums on one or the other of the pins 95 and exerts a downwardly acting force on the release valve operating pin 88, which is moved thereby and acts to unseat the auxiliary reservoir release valve 75 and, if the downward movement is sufficient, to unseat the emergency reservoir release valve 83.

The emergency application valve portion comprises an emergency piston 98 having at one side a chamber 99 open to the brake pipe 37 through passage 100, the strainer device 15 and the brake pipe passage 38, and at the opposite side a valve chamber 101 open through passage 102 to the quick action chamber 13 in the pipe bracket portion 6, said valve chamber containing a main slide valve 103 and an auxiliary slide valve 104 adapted to be operated by said piston.

A portion of the valve chamber 101 at the right hand end is of enlarged diameter and this end of said chamber is closed by a cover plate 105. Disposed in the enlarged portion of said valve chamber is a resistance device comprising a movable member 106 normally pressed into engagement with a shoulder 107 in said chamber by means of a spring 108. The member 106 is provided with a guide portion slidably mounted on the external surface of a projection 109 from the cover plate 105.

The emergency piston 98 is provided with an operating stem 110 having a cavity for operatively carrying the auxiliary slide valve 104, and having a guide portion 111 at its end slidably disposed in a bore in the projection 109. Adjacent the guide portion 111, the stem 110 is provided with a collar 112, which is adapted to engage the movable member 106 and at the time of such engagement, a finger 113 projecting from the main slide valve 103 is also adapted to engage the member 106.

The guide portion 111 is provided with a bore closed at one end by a screw plug 114 and partly open at the other end to the valve chamber 101. Disposed in said bore is a movable plunger 115 having a stem 116 slidably mounted in a suitable bore through the screw plug 114. A spring 117 is disposed between said screw plug and the plunger 115 for opposing inward movement of said plunger.

The main slide valve 103 is adapted to be pressed into engagement with its seat by a force acting through a rocking pin 118 which freely passes through an opening in the emergency piston stem 110 and engages said slide valve in a recess 119.

The upper end of the rocking pin 118 is of enlarged area and engages a flexible diaphragm 120 mounted in the casing. The diaphragm 120 is thus subject on one side to the pressure of fluid in the emergency valve chamber 101 and has at the other side a chamber 121 containing a pressure exerting member 122 engaging the diaphragm 120 and acted upon by a spring 123. The face of member 122 engaging the diaphragm 120 is recessed to receive a small button-shaped boss 124 on the diaphragm, and the upper end of the rocking pin 118 is also recessed to receive a button-shaped boss 125 on the other side of said diaphragm, the engagement of said bosses in their respective recesses being adapted to maintain the member 122 and rocking pin 118 in operative alignment with each other and with the diaphragm.

Associated with the emergency valve device is the usual quick action mechanism 153 comprising a quick action piston 126 having at one side a chamber 127, the open end of which is closed by a cover plate 128 and at the other side a chamber 129 open to the atmosphere through a passage 130. The quick action piston is operatively connected by a stem 131 to a brake pipe vent valve preferably in the form of a valve piston 132 which is contained in a chamber 133, said chamber being open to the brake pipe through passage 134 leading to the brake pipe passage 38 in the pipe bracket portion. The vent valve 132 is normally pressed into engagement with a seat rib 135 by means of a spring 136. The quick action piston chamber 129 has an apertured partition wall 137 and on one side of said wall is disposed a valve seal 138, said seal being held in place by a flanged ring 139 having screw-threaded engagement with the side of the aperture through said partition wall. This seal 138 is adapted to be engaged by a seat rib 140 on the quick action piston 126 so as to prevent leakage of fluid under pressure from piston chamber 127 past said piston, under certain conditions of operation.

Contained within the casing of the emergency application valve device is an inshot valve mechanism 152 which is operative, when effecting an emergency application of the brakes, to control the rate at which fluid under pressure is initially supplied to the brake cylinder, said mechanism comprising a poppet valve 141 contained in a chamber 142 and adapted to be pressed into engagement with a seat rib 143 by a spring 144, and a valve piston 145 having a finger 146, for moving said poppet valve away from the seat rib 143. Normally, said valve piston is urged into engagement with a seat rib 147 by a spring 148 contained in a chamber 149 at one side of said valve piston, and in said position the poppet valve 141 is maintained away from the seat rib 143. The valve piston chamber is open at all times through passage 150 to a small chamber or reservoir 151.

Mounted on a face of the emergency valve casing is a timing valve device 154 and a cut-out valve device 155, both of said devices being preferably contained in one casing 156. The timing valve device 154 is adapted to control the supply of fluid under pressure to the brake cylinder, in effecting an emergency application of the brakes, after the operation of the inshot valve mechanism 152, and comprises a flexible diaphragm 157 having at one side a chamber 158 connected by a passage 159 to the emergency slide valve chamber 101 and containing a diaphragm follower head 160 engaging said diaphragm. The follower head 160 is provided with a stem 161 slidably disposed in a suitable bore in a lug 162 projecting from the casing. At the other side of said diaphragm is a projection 163 having at its outer end a seat rib 164 surrounding a passage 165 extending centrally through said projection, and said diaphragm is adapted to engage said seat rib. Surrounding the projection 163 and engaging said diaphragm is a spring seat 166 acted upon by a spring 167.

The cut-out valve device 155 is provided for rendering the inshot valve mechanism 152 ineffective under certain conditions as will be fully described later, and comprises a flexible diaphragm 168 having at one side a chamber 169 open to the atmosphere through a passage 170 and containing a diaphragm follower 171 urged into engagement with said diaphragm by a spring 172, which is adapted to normally maintain said diaphragm in engagement with a seat rib 173.

The diaphragm follower 171 is provided with a guide pin 174 slidably carried in a bore of a lug 175.

For the purpose of by-passing the strainer device 15 in the pipe bracket portion 6 in case said strainer device becomes clogged, two check valves, 176 and 177, are provided in the emergency valve portion. The check valve 176 is contained in a chamber 178 and is pressed into engagement with a seat rib 179 by a light spring 180 and the check valve 177 is contained in a chamber 181 and is pressed into engagement with a seat rib 182 by a light spring 183. Said check valves normally cooperate in closing communication from the brake pipe passage 38 through passage 134 to passage 100 leading to the passage 24 within the strainer device, but the check valve 176 is adapted to be opened to permit fluid under pressure to flow from passage 134 to passage 100, and the check valve 177 is adapted to permit flow of fluid under pressure in the reverse direction.

The retaining valve device 5 is of the usual construction having a cut-out position in which it is inoperative, and a cut-in position in which it is adapted to permit the release of fluid under pressure from the brake cylinder 4 to the atmosphere until the brake cylinder pressure is reduced to a predetermined degree, at which time it prevents any further reduction in brake cylinder pressure from occurring.

In operation, to initially charge the brake equipment, fluid under pressure is supplied to the brake pipe 37 in the usual manner and flows from said brake pipe through pipe 36, the combined cut-out valve and centrifugal dirt collector 16 to the brake pipe passage 38 in the pipe bracket portion 6 and from passage 38 through the annular chamber 23, and through the strainer device 15 to passage 24 and from thence through passage 41 to the service application valve or triple valve piston chamber 40 and also from passage 24 through passage 100 to the emergency valve piston chamber 99.

With the triple valve piston 39 in the full release position shown in Fig. 1 of the drawings, fluid under pressure flows from piston chamber 40 through a feed passage 184 to valve chamber 42 and from thence through passage and pipe 43 to the auxiliary reservoir 1. Fluid under pressure also flows from the triple valve chamber 42 through a port 185 in the main slide valve 44 to passage 186 leading to a pipe 187 from the emergency reservoir 2, so that said reservoir is also supplied with fluid from the brake pipe and in this manner both the auxiliary reservoir 1 and emergency reservoir 2 are charged with fluid up to brake pipe pressure.

With the emergency piston 98 in the release position shown in Fig. 1 of the drawings, fluid under pressure flows from the emergency piston chamber 99 through a choke 188 to passage 102 leading to the quick action chamber 13 and to the emergency valve chamber 101. Fluid under pressure flows from the emergency valve chamber 101 through passage 153 to diaphragm chamber 158 of the timing valve device 154, and if for any reason the pressure builds up more rapidly in the emergency valve chamber 101 than in the emergency reservoir 2, fluid under pressure flows from said chamber past two check valves 189 and 190, arranged in series, to the check valve chamber 191, and from thence through passage 192 to passage 186 through which fluid under pressure is supplied to the emergency reservoir 2. The check valve 190 is subject to the pressure of a light spring 193 which is provided for seating said check valve upon substantial equalization of pressures acting on the opposite sides thereof. Fluid at the pressure in check valve chamber 191 flows through a choke 194 and passage 195 to the diaphragm chamber 121. The fluid pressures thus equalize on the opposite sides of the loading diaphragm 120, and only the pressure of spring 123 acts through the rocking pin 118 on the main emergency slide valve 103.

In the release position of the triple valve device 9 the brake cylinder 4 is open to the atmosphere through pipe and passage 196, past the inshot check valve 141, through passage 165, cavity 197 in the main triple valve slide valve 44, passage and pipe 198 and the retaining valve device 5 which is normally carried in the cut-out position and will be so considered unless otherwise specified.

The small chamber or reservoir 151 in the emergency valve portion, and the connected inshot valve piston chamber 149 are open to the atmosphere through passage 262, cavity 199 in the main emergency slide valve 103 and passage 165 through which the brake cylinder 4 is connected to the atmosphere. With the brake cylinder passage 196, which is open to the right hand face of the inshot valve piston 145, at atmospheric pressure, spring 148 urges said valve piston into engagement with the seat rib 147, and in this position, the seated area of said valve piston outside of the seat rib 147 is open to the atmosphere through a passage 200 leading to the valve piston chamber 149.

The seated area of the timing valve diaphragm 157 within the seat rib 164 is open to the atmosphere through passage 165 and the seated area of said diaphragm outside of the seat rib 164 is also open to the atmosphere through the brake cylinder passage 196. This permits quick action chamber pressure in diaphragm chamber 158 to hold said diaphragm in engagement with the seat rib 164.

Fluid at brake pipe pressure flows from the brake pipe passage 38 in the pipe bracket portion 6 to passage 134 leading to the vent valve chamber 133 and to the by-pass check valve chambers 201 and 181. The vent valve 132 is normally pressed into engagement with the seat rib 135 on account of the quick action port 203 in the main emergency slide valve being lapped by the auxiliary slide valve 104, said port normally registering with passage 202 leading to the quick action piston chamber 127 which is thus at atmospheric pressure due to the connection to the atmospheric chamber 129 through choke 204 in the piston 126 and a leakage groove 205 by-passing said piston.

Fluid at brake pipe pressure is also supplied from passage 100 in the pipe bracket portion 6 to the by-pass check valve chamber 178 and acts on the adjacent faces of the check valves 177 and 176. Said check valves are thus balanced by fluid pressure and the pressure of spring 180 on check valve 176 and spring 183 on check valve 177 holds said check valves seated.

When the triple valve device is in release position, the quick service modifying valve diaphragm chamber 62 is open to the atmosphere through passage 206, cavity 207 in the main slide valve 44, port 208, choke 209, port 210, retarded release choke 211, cavity 197 and passage and pipe 198 leading to the retaining valve device 5. With the diaphragm chamber 62 thus open to the atmosphere, spring 72 holds the diaphragm 59 deflected downwardly, in which position, the check valve 63 is unseated, which opens the quick service reservoir 14 to the atmosphere through passage 212, check valve chamber 65 and diaphragm chamber 62.

In full release position of the triple valve main slide valve 44, fluid under pressure is supplied from the valve chamber 42 through the service port 213 to the seating face of the auxiliary slide valve 45, and a cavity 214 in said slide valve is open through port 215 in the main slide valve 44 to passage 100 which is charged with fluid at brake pipe pressure. Thus, a certain predetermined area of the seating face of the auxiliary slide valve 45 is subject to fluid under pressure which is adapted to reduce the force required to move said slide valve to quick service position, as will be hereinafter described, so as to cause said triple valve piston 39 and auxiliary slide valve 45 to move upon a reduction in brake pipe pressure of a predetermined light degree. The main slide valve 44, however, is loaded in full release position, so as to require a greater, but predetermined, degree of reduction in brake pipe pressure to move it, said main slide valve being loaded by connecting a cavity 260 in the seating face of said slide valve to the atmosphere through a port 216, choke 217 and a port 218 which registers with the atmospheric passage 198 leading to the retaining valve device 5.

A service application of the brakes is effected upon a gradual reduction in pressure in the brake pipe 37 in the usual manner. As hereinbefore described, the brake pipe 37 communicates with the triple valve piston chamber 40 and emergency valve piston chamber 99, and as a result, the pressure in said chambers gradually reduces with brake pipe pressure.

Upon a predetermined light reduction in pressure in the triple valve piston chamber 40, the pressure of fluid in the triple valve chamber 42 shifts the triple valve piston 39 and auxiliary slide valve 45 toward the right hand and relative to the main slide valve 44. In thus moving, the piston 39 first closes the feed passage 184 so as to prevent back flow of fluid under pressure from the valve chamber 42 to the piston chamber 40, after which the plunger 56 engages the end of the main slide valve 44. Further movement of said piston and auxiliary slide valve to the right relative to the main slide valve is thus resisted by the spring 58. Said spring, however, is of such value that only a slight increase of brake pipe reduction in piston chamber 40 is required to compress it and permit the piston and auxiliary slide valve to move to quick service position. It will be noted that the piston 39, on account of its sensitivity to pressure differentials, quickly responds to a brake pipe reduction to close the feed passage 184 and although movement to the quick service position is opposed by the spring 58, said piston still moves to quick service position upon a slight increase of reduction in brake pipe pressure, the total reduction required to move said piston to quick service position being, for instance, less than one pound.

In quick service position of the auxiliary slide valve 45, the cavity 214 connects port 215 in the main slide valve 44 to port 208 in said slide valve. Port 215 registers with passage 100 which is at all times open to the brake pipe 37 through the strainer device 15 and the brake pipe passage 38 in the filler portion 6, so that fluid under pressure is permitted to flow from the brake pipe to cavity 214 in the auxiliary slide valve and from thence through port 208 and cavity 207 in the main slide valve to passage 206 leading to the diaphragm chamber 62, from which fluid under pressure flows past the check valve 63 to chamber 65 and from thence to the quick service reservoir 14. This produces a sudden, local quick service reduction in pressure in the brake pipe 37 for hastening the operation of the brake controlling device on the next car in a train which then operates in a similar manner, and in this way a quick serial response to the brake pipe reduction is transmitted from one car to the next throughout the length of the train.

It will be noted that port 208 through which fluid under pressure is supplied to the quick service reservoir 14, is also open to the atmosphere, in release position of the main slide valve, through choke 209, port 210, retarded release choke 211, cavity 197 and the retainer valve passage 198. No appreciable reduction occurs through the two chokes 209 and 211 to the atmosphere however, and the effect of the quick service reduction in brake pipe pressure and in the pressure in the triple valve piston chamber 40 causes the triple valve piston to promptly move to service position, in which it engages the gasket 10. The lug 50 on the end of the piston stem 46 just engages the main slide valve 44 in quick service position, so that movement of the piston to service position also shifts the main slide valve from the release position to the service position, as shown in Fig. 3, in which position the quick service reservoir is disconnected from the atmosphere and passage 206 from said reservoir is connected to passage 100 from the brake pipe through the port 216 in the main slide valve, choke 217 and port 218, so that in service position further quick service venting of fluid under pressure from the brake pipe to the quick service reservoir occurs. In quick service position of the triple valve device, the reduction in brake pipe pressure caused by venting fluid under pressure from the brake pipe to the quick service reservoir 14 is adapted to move the triple valve parts to service position, in which position a further reduction in brake pipe pressure is effected by flow to the quick service reservoir until the brake pipe pressure is equalized with the pressure in said reservoir. This final quick service reduction in brake pipe pressure is thus limited and is adapted to hold the triple valve parts in a position for supplying fluid under pressure to the brake cylinder to develop an effective brake cylinder pressure. This final quick-service flow is however limited to a slow rate by the choke 217 so as to dampen or smooth out surges or fluctuations in pressure in the brake pipe which may have been created by the initial sudden and local quick service venting.

In service position of the triple valve slide valves 44 and 45, the service port 213 is uncovered by the auxiliary slide valve 45 and registers with passage 165. This permits fluid under pressure to flow from the triple valve chamber 42 and the connected auxiliary reservoir 1, which is open to said chamber by way of pipe and passage 43, to passage 165 and from thence past the normally unseated inshot valve 141 in the emergency valve portion to passage 196 leading to the brake cylinder 4.

Fluid at the pressure supplied through passage 165 to the brake cylinder 4 also flows from said passage through cavity 199 in the main emergency slide valve 103 to passage 262 leading to the small chamber or reservoir 151 and then flows from said reservoir through passage 150 to the valve piston chamber 149 and from thence through passage 200 to the outer seated area on the other side of said valve piston. The inner seated area on said other side of said valve piston is subject to the pressure of fluid from passage 165 supplied to passage 196. Thus, the opposing fluid pressures acting on the inshot valve piston 145 are equal, and spring 148 maintains said valve piston and the poppet valve 141 in the position shown in Fig. 1.

In the manner just described, fluid under pressure is supplied by the service application valve or triple valve device 9 to the brake cylinder 4 upon a gradual reduction in brake pipe pressure to effect a service application of the brakes and it will be noted that the inshot valve piston 145 and poppet valve 141 do not move from their normal position.

In effecting a quick service reduction in brake pipe pressure, when the pressure in the modifying valve diaphragm chamber 62 builds up to a low degree, such as for instance 6 pounds, the diaphragm 59 is deflected upwardly against the opposing pressure of spring 72 contained in the atmospheric chamber 60. This movement of said diaphragm pulls the operating pin 67 away from the poppet valve 63 and permits spring 66 to control said valve. Spring 66 is of small value however, being merely sufficient to seat said valve, so that while fluid under pressure continues to be supplied from the brake pipe to the diaphragm chamber 62, a small pressure differential on said valve permits fluid under pressure to flow from the diaphragm chamber 62 to the quick service reservoir 14 to effect the operation hereinbefore described. The check valve 63 and diaphragm have no effect in effecting an application of the brakes in the manner hereinbefore described but are only adapted to annul the quick service action after the initial application of the brakes in "cycling" as will be fully described hereinafter.

Upon a service reduction in pressure in the emergency piston chamber 99, the emergency piston 98 and auxiliary slide valve 104 are shifted toward the left, relative to the main slide valve 103, by the quick action chamber pressure in valve chamber 101. This movement of the auxiliary slide valve 104 brings a port 221 in said slide valve into registration with a port 222 through the main slide valve. Port 222 registers with an atmospheric passage 223 through which fluid under pressure is adapted to be vented from the emergency valve chamber 101 and the connected quick action chamber 13. The rate at which the pressure of fluid is thus reduced in valve chamber 101 is substantially equal to the service rate of reduction in pressure in the emergency piston chamber 99 and is thus adapted to substantially destroy the operating pressure differential on the piston 98. In the service position, the plunger 115 in the emergency valve piston stem 110 is adapted to just engage the right hand end of the main slide valve 103, so that further movement of the piston and auxiliary slide valve to the left and beyond the service position is resisted by the pressure of spring 117.

In order to limit the degree of brake application, the brake pipe pressure is only reduced an amount sufficient to effect the desired service application of the brakes. Then, when the auxiliary reservoir pressure acting in the triple valve chamber 42 is reduced by flow through the service port 213 and passage 165 to the brake cylinder 4 an amount substantially equal to the degree of brake pipe reduction in the triple valve piston chamber 40, the triple valve piston 39 and auxiliary slide valve 45 are moved from service position to the left to service lap position in which said piston engages the end of the main slide valve 44 and stops. This movement is initiated by the pressure of spring 58 in the triple valve piston stem 46 which acts against the main slide valve and is adapted to pull the piston away from the gasket 10 or in other words to break the seal between said piston and gasket. After the piston seal is thus broken, a slight pressure differential on said piston, caused by the pressure in valve chamber 42 reducing slightly below the brake pipe pressure in piston chamber 40, moves said piston and auxiliary slide valve to lap position, in which said slide valve laps the service port 213 and prevents further flow of fluid under pressure from the auxiliary reservoir to the brake cylinder 4.

When the degree of brake pipe reduction is thus limited, the quick action chamber pressure in the emergency valve chamber 101 continues to reduce through port 221 in the auxiliary slide valve 104 until the pressure in said chamber is slightly below the brake pipe pressure in piston chamber 99, at which time the pressure differential created on the emergency piston 98 shifts said piston and the auxiliary slide valve 104 back to the release position as shown in Fig. 1, in which position port 221 is moved out of registration with port 222 through the main slide valve 103 and further reduction in pressure in the emergency valve chamber 101 is thus prevented.

In service position of the triple valve, the cavity 260 is open to the passage 100, which is at all times charged with fluid at brake pipe pressure, through port 216, choke 217 and port 218. Brake pipe pressure thus acting in cavity 260 reduces the seating pressure of the main slide valve a predetermined amount, thereby making it easier to obtain a release of the brakes and also ensures movement of the triple valve piston 39 and slide valves 44 and 45 from service position to release position upon a slow increase in brake pipe pressure as will now be described.

To effect a release of the brakes after an application, fluid under pressure is supplied to the brake pipe 37 and flows from said brake pipe to the triple valve piston chamber 40 and emergency valve piston chamber 99 in the manner hereinbefore described.

In supplying fluid under pressure to the brake pipe to effect a release of the brakes, it is customary to initially turn the usual brake valve device to release position in which fluid under pressure is supplied directly from the main reservoir through the brake valve device to the brake pipe and then after a predetermined interval of time, which is varied, as in accordance with the length of the train, the brake valve device is turned to the usual running position, in which the pressure of fluid supplied to the brake pipe is reduced by a feed valve device to that normally carried in the brake pipe.

The initial supply of fluid at high pressure to the brake pipe rapidly increases the brake pipe pressure in the front portion of the train and at or near the locomotive the brake pipe pressure may be increased to substantially that carried in the main reservoir. This high head of pressure at the front end of the train is adapted to cause a rapid flow of fluid under pressure to the rear of the train so as to accelerate the release of the brakes and the charging of the brake equipment at the rear end of the train.

The rapid increase in brake pipe pressure at the front end of the train builds up a differential on the triple valve piston 39 which causes said piston to move to release position, in which position collar 50 on the piston stem 46 and finger 54 on the main slide valve 44 engage the retarded release member 51. In this full release position the feed passage 184 is open so that fluid under pressure is permitted to flow from the piston chamber 40 to the valve chamber 42, but the flow capacity of said feed passage is insufficient to offset the rapid rate of increase in brake pipe pressure in piston chamber 40. As a result, a sufficient pressure differential is built up on said piston to move said piston and the slide valves 44 and 45 to retarded release position, as shown in Fig. 2, against the resisting pressure of the retarded release spring 52. In this position, the piston 39 engages a stop rib 224 in the casing.

In the retarded release position, the rate at which fluid under pressure is permitted to flow from the piston chamber 40 to the valve chamber 42 is restricted by a feed groove 225 which is of smaller flow area than feed passage 184. In addition to the restricted flow through feed groove 225, fluid under pressure is also supplied from the fully charged emergency reservoir through pipe 187, passage 186, cavity and port 185 and choke 226 in the main slide valve 44 to valve chamber 42 and from thence through passage and pipe 43 to the auxiliary reservoir 1. Due to thus restricting the supply of fluid under pressure from the brake pipe to the auxiliary reservoir and on account of supplying fluid under pressure from the emergency reservoir to the auxiliary reservoir, the amount of fluid taken from the brake pipe at the front end of the train is small and this hastens the rate at which the brake pipe is charged at the rear end of the train. The choke 226 limits the rate at which fluid under pressure flows from the emergency reservoir 2 to the auxiliary reservoir 1 to such an extent that, after the brake valve device is moved from release position to running position and the brake pipe pressure at the front end of the train drops to or below that supplied by the feed valve device, the auxiliary reservoir pressure in valve chamber 42 will be less than the brake pipe pressure in piston chamber 40, so as to prevent undesired movement of the triple valve device to quick service or service position.

In retarded release position, the brake cylinder 4 is open to the atmosphere through pipe and passage 196, past the inshot poppet valve 141, through passage 165, cavity 197 in the main triple valve slide valve 44, through the retarded release choke 211, port 210 and passage and pipe 198 leading to the retaining valve device 5. Fluid under pressure is thus vented from the brake cylinder at a rate controlled by the retarded release choke 211 which permits a slow release of the brakes at the head end of the train.

Fluid under pressure is also vented from the quick service, modifying valve diaphragm chamber 62 through passage 206, cavity 207 in the main slide valve 44, port 208, choke 209 and through the vented port 210. When the pressure in the diaphragm chamber 62 is thus reduced to a degree less than the pressure of spring 72, said spring deflects said diaphragm downwardly, thereby unseating the poppet valve 63. This opens communication from the quick service reservoir 14 through passage 212 to the diaphragm chamber 62, so that fluid under pressure is vented from the quick service reservoir as the brakes are released.

In the retarded release position of the main triple valve slide valve shown in Fig. 2, it will be noted that a portion of the seating face of the main slide valve 44, at the left hand end extends out and into the valve chamber 42, thereby being subjected to the pressure of fluid in said valve chamber. In addition, one end of passage 261 is uncovered by the right hand end of the main slide valve and permits fluid under pressure to flow from the valve chamber 42 to the cavity 260. By this means a predetermined area of the seating face of the main slide valve at each end is unloaded in retarded release position, so that after the brake valve device is moved from release to running position and the pressures acting on the opposite sides of the triple valve piston 39 become substantially equal, the pressure of the retarded release spring 52 is permitted to readily shift the triple valve piston 39 and slide valves 44 and 45 to the full release position shown in Fig. 1, in which the feed passage 184 is opened and port 215 registers with passage 100 so that upon a succeeding application of the brakes, the quick service action will be effective. It will be evident that if the main slide valve were not thus moved from retarded release position to full release position, quick service action would not be effective upon a succeeding application of the brakes.

In full release position of the triple valve slide valves, fluid under pressure may continue to flow from the emergency reservoir 2 to the valve chamber 42 and auxiliary reservoir 1 by way of port 185 and choke 226 in the main slide valve 44, but after equalization of the pressures in both of said reservoirs, fluid under pressure supplied through feed passage 184 to valve chamber 42 completes the charging of the auxiliary reservoir up to the pressure carried in the brake pipe, and as the auxiliary reservoir pressure is built up, fluid under pressure flows from the valve chamber 42 through port 185, passage 186 and pipe 187 to the emergency reservoir 2, thereby recharging said reservoirs.

In the full release position of the triple valve slide valve 44, passage 165 from the brake cylinder is open directly through cavity 197 to the release passage 198 leading to the retaining valve device 5, so that the final release of fluid under pressure from the brake cylinder is at the standard rate.

In effecting a service application of the brakes, the emergency piston 98 and auxiliary slide valve 104 move toward the left to vent fluid under pressure from the emergency valve chamber and quick action chamber, but after the pressure in said chambers reduces substantially equal to or slightly below the reduced brake pipe pressure, said piston and valve are returned to their normal or release position in which the choke 188 is open to the piston chamber 99, as hereinbefore described. In releasing the brakes after a service application, the flow area of the choke 188 is so small that the initial high brake pipe pressure at the head end of the train, creates sufficient differential on piston 98 to move said piston and the slide valves 103 and 104 to their extreme right hand position, in which said piston engages a stop lug 227 in the casing and in moving to said position, the member 106 is moved against the pressure of spring 108 and compresses said spring. This operation of the emergency valve device has no effect in releasing the brakes after a service application of the brakes and in fact is merely incidental.

The volume of the quick action chamber 13 and the connected emergency slide valve chamber 101 is not great, and even though the port 188 in the quick action piston chamber wall is small, there would be a possibility on cars at the head end of a train of charging said chambers to a pressure greater than normally carried in the brake pipe, in which case the emergency valve device would tend to operate to effect an undesired emergency application of the brakes, as will be hereinafter fully described, when the brake pipe pressure reduces to normal upon movement of the brake valve device to running position. In order to prevent said chambers from thus becoming overcharged in releasing the brakes, the emergency valve chamber 101 is connected to the emergency reservoir 2 through a passage 228, past the check valves 189 and 190, through passages 192 and 186 and through pipe 187. This prevents the pressure in said chambers from ever exceeding emergency reservoir pressure which at no time becomes higher than brake pipe pressure.

In releasing the brakes after a service application, the relatively slow rate of increase in brake pipe pressure at the rear end of the train moves the triple valve device only to full release position into engagement with the retarded release member 51 and in which the feed passage 184 is opened. The flow capacity of feed port 184 is sufficiently great to offset the slow rate of increase in brake pipe pressure and limit the differential on the triple valve piston to a degree insufficient to cause said piston to compress the retarded release spring 52.

In the full release position of the triple valve device, fluid under pressure is supplied from the emergency reservoir 2 to the auxiliary reservoir at the same time as from the brake pipe through the feed passage 184, thereby accelerating the charging of the auxiliary reservoir up to equalization with the emergency reservoir, after which both reservoirs are charged up to brake pipe pressure by fluid under pressure supplied through the feed passage 184. Fluid under pressure is vented from the brake cylinder 4 in the same manner as hereinbefore described except that the complete venting occurs directly from passage 165 through cavity 197 in the main slide valve 44 and passage and pipe 198 leading to the retaining valve device 5, so that there is no retarding of the release of brakes as occurs in retarded release position of said slide valve. Fluid under pressure is also vented from the quick service reservoir through the modifying valve device 73, passage 206, port 208, choke 209, port 210, retarded release choke 211, cavity 197, and passage and pipe 198, the effect of said chokes on such venting being merely incidental, said chokes being provided for other purposes as hereinbefore described.

The slow rate of increase in brake pipe pressure at the rear end of the train has no operative effect upon the emergency application valve piston 98 which returned to release position after the quick action chamber pressure in valve chamber 101 reduced to slightly below brake pipe pressure in effecting a service application of the brakes, for the reason that said quick action chamber and valve chamber charge through the choke 188 at substantially the same rate as the brake pipe pressure increases in the piston chamber 99.

To effect an emergency application of the brakes, fluid under pressure is suddenly vented from the brake pipe 37 and the connected triple valve piston chamber 40 and emergency valve piston chamber 99 and the triple valve device operates in the same manner as in effecting a service application of the brakes, to supply fluid under pressure from the auxiliary reservoir 1 through the slide valve chamber 42 and service port 213 to passage 165 through which fluid under pressure is supplied to the brake cylinder 4.

At substantially the same time as the triple valve device operates upon an emergency reduction in brake pipe pressure, the quick action chamber pressure acting on the right hand side of the emergency piston 98 shifts said piston and the slide valves 103 and 104 outwardly to emergency position, in which said piston engages the gasket 12. In thus moving to emergency position, there is a slight hesitation of the piston at the time the collar 112 on the piston stem 110 engages the right hand end of the main slide valve 103, during which, the differential on the emergency piston increases sufficiently to move the main slide valve to emergency position. At the time this hesitation occurs, however, the port 203 through the main slide valve 103 is uncovered by the auxiliary slide valve 104 which permits fluid under pressure to flow to passage 202 and from thence to the quick action piston chamber 127. When the emergency piston and slide valves move to emergency position however, the passage 202 is uncovered by the right hand end of said slide valve, which permits further flow of fluid under pressure from the emergency valve chamber 101 and the connected quick action chamber 13 to the quick action piston chamber 127.

The pressure of fluid thus supplied to the quick action piston chamber 127 shifts the piston 126 to the left into engagement with the seal 138. This movement shifts the vent valve 132 away from the seat rib 135, thereby opening the brake pipe passage 134 to the atmospheric chamber 129 through which fluid under pressure is suddenly vented from the brake pipe 37 for the purpose of serially transmitting the emergency action through the train in the well known manner.

By initially supplying fluid under pressure from the emergency valve chamber 101 to the quick action piston chamber 127 before movement of the main slide valve 103, the chamber 127 becomes partially charged, so that upon movement of the main slide valve to emergency position, less fluid has to be supplied to the quick action piston chamber to effect opening of the vent valve 132, and by this means the brake pipe is locally vented in the shortest possible time. It will be noted that if for any reason it is impossible for the emergency piston 98 to move the main slide valve 103 from the release position to emergency position, the operation of the quick action piston 126 will however be obtained by fluid under pressure supplied through the port 203 in said main slide valve.

Fluid under pressure is gradually vented from the emergency slide valve chamber 101 and quick action chamber 13 through the choke 204 in the quick action piston 126 to the atmospheric chamber 129, and when reduced to a predetermined degree, the pressure of spring 136 on the vent valve 132 returns said valve into engagement with the seat rib 135, and thus piston 126 to the position shown in the drawings. The rate at which the quick action chamber pressure reduces through the choke 204 is however sufficiently slow as to ensure the complete venting of fluid under pressure from the brake pipe.

The choke 204 through the quick action piston 126 is small and said piston is pressed into engagement with the seal 138 by fluid under pressure supplied to chamber 127, so that possible leakage of fluid under pressure past the periphery of the piston is prevented, thereby ensuring that the vent valve 132 will be held open for a definite predetermined period of time governed entirely by the size of said choke and the volume of the quick action chamber and emergency valve chamber. In fact, choke 204 is so small that possible leakage from the emergency valve chamber 101 past the main slide valve 103 or auxiliary slide valve 104 to passage 202 might at some time exceed the capacity of said choke, and cause said piston to unseat the vent valve 132 when not desired. In order to prevent such from occurring, the leakage groove 205 is provided to connect the opposite sides of said piston when it is in its normal position, said leakage groove having a relatively large flow area.

In emergency position of the emergency slide valve 103, a cavity 230 in said slide valve connects passage 186 from the emergency reservoir 2 to passage 165 to which fluid under pressure is being supplied by the triple valve device from the auxiliary reservoir 1.

Fluid under pressure thus supplied from the auxiliary reservoir 1 and emergency reservoir 2 to passage 165 flows to the inshot poppet valve chamber 142 and from thence past the inshot valve piston operating finger 146 to the inner seated area of said valve piston and to passage 196 leading to the brake cylinder 4 and rapidly builds up a pressure in said brake cylinder.

Passage 262 from the small reservoir 151 is lapped in emergency position of the emergency slide valve, and since passage 262 was connected to the vented passage 165 in release position of the triple valve device and emergency valve device, the small reservoir 151 and the connected valve piston chamber 149 are at atmospheric pressure when an emergency application of the brakes is initiated in the manner above described. As a result, the inshot valve piston 145 is held in engagement with the seat rib 147 only by the force of spring 148.

When the pressure of fluid being supplied to the brake cylinder 4 through passage 196 and acting on the seated area of the inshot valve piston 145 within the seat rib 147 becomes sufficiently great to overcome the resisting force of spring 148, said valve piston starts moving toward the left. Upon breakage of the seal with the seat rib 147, the entire face of said valve piston is acted upon by the pressure of fluid being supplied to the brake cylinder, and said valve piston is thereby rapidly moved against the pressure of spring 148 into sealing engagement with a gasket 231.

With the inshot valve piston seated on gasket 231, the pressure of spring 144 moves the poppet valve 141 into engagement with seat rib 143, thereby closing the unrestricted connection between the supply passage 165 and the brake cylinder passage 196, as shown in Fig. 4 of the drawings. With the poppet valve 141 seated, fluid under pressure continues to flow from passage 165 to passage 196 and from thence to the brake cylinder 4 at a restricted rate governed by the choke 232, by-passing the poppet valve 141.

The pressure of fluid in passage 165 acts inside of the seat rib 164 on the timing valve diaphragm 157 and the area of said diaphragm outside of said seat rib is subject to the pressure of fluid in passage 196 through which fluid under pressure is being supplied to the brake cylinder and chamber 158 at the other side of said diaphragm is subject to the reducing quick action chamber pressure in the emergency valve chamber 101. When the increasing fluid pressures on the left hand side of said diaphragm plus the pressure of spring 167 become sufficient to overbalance the pressure in diaphragm chamber 158, said diaphragm is deflected away from the seat rib 164. The pressure acting within said seat rib is greater than the pressure acting on the outside of the seat rib due to the restriction of choke 232, so that upon breaking the seal between the diaphragm and seat rib, the whole surface of the diaphragm is exposed to the higher pressure from passage 165, which quickly deflects said diaphragm and moves follower 160 into engagement with the lug 162, as shown in Fig. 5 of the drawings. This effects an unrestricted communication from passage 165 to passage 196, through which fluid under pressure is supplied from the emergency reservoir and auxiliary reservoir to the brake cylinder 4, and the brake cylinder pressure builds up to equalization with the pressure in said reservoirs.

Upon substantially complete venting of fluid at quick action chamber pressure from the emergency valve chamber 101, the pressure of spring 117 in the emergency piston stem 110 moves the piston 98 and auxiliary slide valve 104 relative to the main slide valve 103, but upon the force of said spring being expended, the movement of said piston and valve ceases. As a result, the main slide valve 103 remains in emergency position and maintains communication from the emergency reservoir 2 to the brake cylinder 4 through passage 186, cavity 230 and passage 165. Communication is also maintained between the auxiliary reservoir 1 and brake cylinder 4 through the triple valve device in emergency, so that if there is leakage from the brake cylinder, the volume of said reservoirs connected with said brake cylinder reduces the effect of such leakage and tends to maintain an effective brake cylinder pressure.

With fluid under pressure completely vented from the emergency valve chamber, the main slide valve 103 is maintained seated against the pressure of fluid in cavities 230 and 233 by fluid at emergency reservoir pressure acting in chamber 121 on diaphragm 120, the pressure on said diaphragm being transmitted through the rocking pin 118.

From the above description of effecting an emergency application of the brakes, it will be noted that, although the supply of fluid under pressure to the brake cylinder is continuous from the start to equalization with the pressure of fluid in the auxiliary and emergency reservoirs, the build up is in three distinct stages. There is an initial quick inshot before the inshot poppet valve 141 seats, then there is a slow build up through choke 232 and finally a rapid build up past the unseated timing valve diaphragm 157. The initial inshot may be of any small degree, such as 15 pounds in the brake cylinder, which is not adapted to provide effective braking power, but its primary purpose is to set up a slight retardation for causing the slack in the train to gradually gather without causing severe shocks. The slow build up through choke 232 may increase the brake cylinder pressure by only about 5 pounds and is of such duration as to permit the train slack to completely gather, after which the timing valve device 154 operates to permit a rapid final increase in brake cylinder pressure for stopping the train.

If the brake pipe and brake equipment on a train were leakproof, the brake controlling devices at the rear end of the train as well as those at the front end of the train would operate in effecting an emergency application of the brakes in the manner above described, and it is obvious that the three stages of brake cylinder build up on, say the first and last cars of the train would parallel each other and be spaced from each other by a degree of time equal to that required for transmitting quick serial venting of the brake pipe from the first car to the last car. This operation is theoretical and would not be most desirable, since it would be better to obtain a more nearly synchronous build up of brake cylinder pressure on the front and rear of the train in order to reduce to a minimum the undesirable and often disastrous running in of the cars at the rear of the train against those at the front of the train, and according to the invention means are provided for attaining this result in the following manner.

It is well known that the brake pipe on a train of cars is subject to leakage and if the brake pipe leakage on a train of say 150 cars in length is for instance 15 pounds per minute, the brake pipe may be considered in good condition. Since fluid under pressure is normally supplied to the brake pipe at only one end, as at the locomotive, the brake pipe pressure at the front end of the train will be substantially equal to that supplied by the usual feed valve device. Due to leakage from the brake pipe through the train however, the brake pipe pressure will drop, and at the rear of the train the brake pipe pressure will be lower than at the front of the train by a degree substantially equal to the degree of brake pipe leakage. In other words, if the normal pressure supplied by the feed valve device is 70 pounds and there is 15 pounds per minute leakage from the brake pipe, the brake pipe pressure at the front end of the train will be 70 pounds but at the rear end of a train of say 150 cars length the brake pipe pressure will be about 55 pounds and this difference in brake pipe pressure throughout the brake pipe on the train is commonly called the brake pipe gradient.

If the brake pipe pressure at the rear of the train is built up to only 55 pounds, the brake equipments including the reservoirs and chambers will also build up to only 55 pounds and it is therefore obvious that the pressure in the timing valve diaphragm chamber 158 will also be substantially 55 pounds.

If now an emergency application of the brakes is effected, there will be the initial inshot of fluid under pressure to the brake cylinder by way of the open inshot poppet valve 141 in the same manner as hereinbefore described. This inshot will be substantially the same at both the front and rear of the train due to being governed by the pressure of spring 148 acting on the inshot valve piston 145, but the start of the inshot on the rear car in the train will be possibly 8 seconds after it is started on the first car, this 8 seconds being the time required to transmit the quick venting of brake pipe through the train of say 150 cars length.

After the inshot poppet valve 141 closes, the flow of fluid to the brake cylinder through the choke 232 at both ends of the train will also be substantially the same, and after this slow build up of brake cylinder pressure at the front end of the train, which requires about say 14 seconds, sufficient pressure is obtained on the timing valve diaphragm 157 to deflect said diaphragm against the reducing quick action chamber pressure in chamber 158, after which the final rapid build up occurs as hereinbefore described. At the front end of the train the quick action chamber pressure starts reducing, upon movement of the emergency valve device to emergency position, from 70 pounds, but at the rear of the train, the quick action chamber pressure starts reducing from say 55 pounds. At the rear of the train the initial inshot and slow build up are at substantially the same rate as at the front end but occurs about 8 seconds later. Since the quick action chamber pressure is lower however, less brake cylinder pressure has to build up on the timing valve diaphragm 157 to shift it to its open position than is required at the front end, and this causes a shorter period of slow build up before the final rapid build up than is obtained on the front end of the train, with the result that the final rapid build up, which produces the braking power for stopping the train, occurs at substantially the same time on the rear of the train as on the front of the train.

If the brake pipe leakage is greater than 15 pounds per minute, the time of the slow build up at the rear end of the train is further reduced, with the result that the final build up of brake cylinder pressure at a rapid rate on the rear portion of the train may slightly precede that on the front portion of the train.

If the brakes are released when an emergency application is effected, the movement of the emergency slide valve 103 to emergency position laps passage 262 so that reservoir 151 and chamber 149 at the spring side of the valve piston 145 are at atmospheric pressure and said valve piston is moved from seat rib 147 when the brake cylinder pressure acting on the area of said valve piston within the seat rib 147 exceeds the pressure of spring 148, as hereinbefore described.

If an emergency application of the brakes is effected, however, on top of a service application of the brakes, the fluid at brake cylinder pressure is trapped in reservoir 151 and chamber 149, when the emergency slide valve 103 moves to emergency position, so that the brake cylinder pressure acting on the valve piston 145 within the seat rib 147 must be built up to a correspondingly higher degree before the valve piston 145 will be shifted to permit closure of the valve 141. A substantially uniform initial inshot of fluid under pressure to the brake cylinder is thus effected in an emergency application of the brakes, even though an emergency application is effected while the brakes are applied in service. This reservoir 151 is merely provided for increasing the volume of the chamber 149 so that any leakage past the main emergency slide valve 103 or the valve piston 145 to chamber 149, can not charge the pressure acting in said chamber sufficiently to materially affect the pressure required in passage 196 and acting on the seated area of the valve piston 145 within the seat rib 147, to move said valve piston into engagement with gasket 231 and permit the poppet valve 141 to seat. The by-pass passage 200 opening into chamber 149 is provided to ensure that the seated area of the valve piston 145 outside of the seat rib 147 is initially at atmospheric pressure, so as to prevent leakage from affecting the operation of the valve piston in controlling the initial inshot.

The purpose of the timing valve diaphragm follower 160 is to provide a larger bearing area for the diaphragm 157 so as to prevent damage to said diaphragm when it is deflected to its right hand position.

To effect a release of the brakes after an emergency application, fluid under pressure is supplied to the brake pipe 37 and flows to the triple valve piston chamber 40 and to the emergency valve piston chamber 99. The triple valve piston 39 is subject in the valve chamber 42 to reduced auxiliary reservoir pressure, but the emergency valve chamber 101 is at atmospheric pressure. Consequently, upon a slight increase in brake pipe pressure, sufficient differential is obtained on the emergency piston 98 to start moving said piston and the slide valves 103 and 104 toward the right hand. As hereinbefore described, the choke 188 through the emergency piston chamber wall is inadequate to offset the rapid rate at which the pressure in piston chamber 99 is increased at the head end of the train, so that the piston 98 is moved upon a slight increase in brake pipe pressure, of for instance 7 pounds, to its extreme right hand or back dump position, in which said piston compresses the spring 108 and engages the stop lug 227.

In back dump position, passage 165, which is open to the brake cylinder through the open timing valve device 154, is connected through cavity 199 in the emergency slide valve to a passage 234 leading to the lower side of a ball check valve 235. Thus, fluid under pressure is permitted to flow from the brake cylinder 4 to the lower side of said check valve and unseat said valve against the pressure of spring 236 and then flow through passage 240 to passage 134 leading to the brake pipe passage 38 in the pipe bracket portion 6. Passage 165 is also supplied with fluid under pressure from the auxiliary reservoir 1 through the triple valve device which is still in its service position. As a result, there is a rapid flow of fluid under pressure from the brake cylinder 4 and from the auxiliary reservoir 1 to the brake pipe 37, which charges the brake pipe with fluid under pressure at a rapid rate. This action naturally occurs first at the front end of the train where the increase in brake pipe pressure is first effective, and the sudden increase in brake pipe pressure caused by operation of the emergency valve device on the first car causes the emergency valve device on the next car to operate in a similar manner and this operation is thus rapidly transmitted serially from car to car throughout the length of the train. This action effects several desirable results. It economizes in the use of fluid under pressure, it suddenly increases the break pipe pressure on the entire train from zero to about 40 pounds, thereby hastening the charging of the train after an emergency application of the brakes, and finally, by reducing auxiliary reservoir pressure to a low degree and substantially to equalization with the brake pipe, it ensures movement of the triple valve device to effect a release of the brakes on the rear end of the train, as will now be described more in detail.

In effecting an emergency application of the brakes, the pressure of fluid in the auxiliary and emergency reservoirs equalizes into the brake cylinder at approximately 60 pounds, assuming the brake pipe pressure to have normally been 70 pounds. In order to effect a release of brakes after an emergency application when the auxiliary reservoir pressure is not reduced as in the present case, the brake pipe pressure has to be increased above the 60 pounds in order to obtain a differential on the triple valve piston 39 for moving it and the slide valves 44 and 45 to release position. At the rear end of a train, the rate at which brake pipe pressure increases from the supply through the usual brake valve device is relatively slow and as it increases and approaches the pressure of the supply, the rate of increase reduces. It is thus obvious that the rate of increase at 60 pounds brake pipe pressure is slower than it is at say 40 pounds brake pipe pressure and at 60 pounds it would be more difficult to obtain the releasing differential on the triple valve piston 39, particularly against possible leakage past said piston, than it is with the present valve device where the auxiliary reservoir pressure in the triple valve chamber 42 is reduced to substantially 40 pounds.

After the brake pipe pressure is suddenly increased by the supply of fluid under pressure from the brake cylinder 4 and auxiliary reservoir 2, it continues to be charged in the usual manner. At the head end of the train, the supply of fluid under pressure to the brake pipe through the brake valve device in release position moves the triple valve piston 39 and slide valves 44 and 45 to retarded release position, in which the release of the remaining fluid under pressure from the brake cylinder is retarded by choke 211 in the main slide valve 44, and fluid at the reduced pressure in the emergency reservoir 2 flows back and equalizes into the auxiliary reservoir, after which both reservoirs charge with fluid under pressure supplied from the brake pipe past the triple valve piston 39 through feed groove 225. Upon moving the brake valve device to running position, the triple valve device moves from retarded release position to full release position, in which the final release of fluid under pressure from the brake cylinder and the charging of the reservoirs 1 and 2 occurs in the same manner as hereinbefore described in connection with releasing after a service application of the brakes. The emergency valve device at the front end of the train is initially moved to its back dump position as hereinbefore described, but after the quick action chamber 13 and emergency slide valve chamber 101 becomes charged with fluid under pressure supplied from the brake pipe through choke 188 to within possibly 3 pounds of the brake pipe pressure in piston chamber 99, the spring 108 moves the emergency valve parts to their release position shown in Fig. 1, in which position the chambers 13 and 101 are charged up to brake pipe pressure through the choke 188. When the brake pipe pressure becomes increased above the brake cylinder and auxiliary reservoir pressures, it will be noted that the check valve 235 prevents back flow from the brake pipe to the emergency reservoir.

The release of brakes and recharging of the auxiliary and emergency reservoirs at the rear end of the train after an emergency application of the brakes is the same as in releasing after a service application, except that the emergency valve device is initially moved to the back dump positioned and then returns to release position, as hereinbefore described. The triple valve device is however not moved from the service position to release position by the sudden increase in brake pipe pressure effected through operation of the emergency valve device. As hereinbefore described, the brake pipe pressure is rapidly increased to possibly 40 pounds, but this pressure is less than that retained in the auxiliary reservoir by a degree equal to the pressure of spring 236 acting on the ball check valve 235. As a result, the brake pipe pressure has to be increased above that obtained in the brake pipe by the sudden back dump in order to obtain sufficient differential on the triple valve piston to move it to release position. If said spring were not used and substantial equalization of pressures were allowed to occur in the brake pipe and auxiliary reservoir, then the pressure surges created in the brake pipe by the sudden back dump of fluid under pressure from the auxiliary reservoir and brake cylinder into the brake pipe might cause the triple valve piston 39 to shift the slide valves 44 and 45 back and forth between service and release positions, causing alternately a partial release of the brakes and then a partial application of the brakes with a consequent drain and loss of fluid under pressure from the brake pipe, the auxiliary reservoir and emergency reservoir. Besides the loss of fluid under pressure through this action, the quick service action would be effective upon every movement from release to service position and in addition to this quick service action effecting an undesirable loss of fluid under pressure from the brake pipe, it would create additional surges in the brake pipe which would merely aggravate the unstable brake pipe condition. It has been found that under certain conditions of operation, the triple valve device is not unstable and does not operate as just described when the spring 236 is not employed, but realizing the proximity of this unstable condition, the spring 236 is employed to insure against such undesirable action and at the same time said spring does not reduce the degree of back dump to any appreciable extent.

After the triple valve device is moved to release position, the charging of the brake equipments and the venting of fluid under pressure from the brake cylinder to the atmosphere occurs in the same manner as after the tripple valve device moves to full release position at the front end of the train.

If due to breakage of spring 108 or for any reason said spring should not return the emergency valve piston 98 and slide valves 103 and 104 from the back dump position, shown in Fig. 2, to the release position, shown in Fig. 1, the emergency valve device will operate upon a service reduction in brake pipe pressure in the same manner as hereinbefore described, for the reason that the service vent port 222 through the emergency slide valve 103 opens into an enlarged portion at the slide valve seat which maintains communication with the atmospheric port 223 in back dump position, as well as in release position. If this were not so, and the pressure of fluid in the emergency valve chamber 101 were not permitted to reduce upon a service reduction in brake pipe pressure, then the differential required on the emergency piston 98 to move said piston and the slide valves 103 and 104 from the back dump position might be such that their movement would not cease in service position, in which port 222 registers with the atmospheric passage 223, but the piston and slide valves would move to emergency position and cause an undesired emergency application of the brakes to be effected on the train.

When a service application of the brakes is effected, the pressure of fluid supplied to the small reservoir 151 and to the inshot valve piston chamber 149 for holding the inshot poppet valve 141 unseated, also acts through passage 262 on the seated area of the cut-out valve diaphragm 168 within the seat rib 173 but is insufficient in degree to move said diaphragm from said seat and therefore has no effect. When an emergency application of the brakes is effected, fluid under pressure is supplied from the emergency reservoir passage 186 through passages 192 and 237, cavity 233 in the emergency slide valve and passage 238 to the seated area of the cut-out valve diaphragm outside of the seat rib 173, but as in effecting a service application of the brakes, this also has no effect upon the cut-out valve diaphragm in normal operation, as hereinbefore described, when the normal brake pipe pressure and consequently the pressure of fluid obtained in the emergency reservoir 2 is of a predetermined value such as 70 pounds.

In a short train the slack action is not so severe as in a long train and especially when short trains are used in high speed service the effect of slack is so reduced that it is substantially unnecessary to take the extreme precautions as in braking a long train which may travel at a relatively slow speed. Accordingly, the cut-out valve device 155 is provided for permitting a rapid build up of brake cylinder pressure to occur on a short train upon an emergency application of the brakes. By thus rendering the inshot valve device 152 and timing valve device 154 ineffective to control the supply of fluid under pressure to the brake cylinder 4 in effecting an emergency application of the brakes, a quicker application and quicker stop is obtained.

For controlling a short, high speed train, it is usual to employ a higher brake pipe pressure than is employed in the ordinary long train service hereinbefore described. As a result, the auxiliary reservoir 1 and emergency reservoir 2 are charged to the higher brake pipe pressure, which may be for instance 90 pounds. When an emergency application of the brakes is effected with this pressure, the emergency valve device establishes communication from the emergency reservoir 2 to the seated area of the cut-out valve diaphragm 168 outside of the seat rib 173, by way of pipe 187, passages 188, 192, 237, cavity 233 in the emergency slide valve 103 and passage 238. This high emergency reservoir pressure acting on the cut-out valve diaphragm is adapted to deflect said diaphragm away from the seat rib 173 against the opposing pressure of spring 172, and thereby permit fluid at emergency reservoir pressure to flow to passage 262 and from thence to the small reservoir 151 and from said reservoir through passage 150 and to the inshot valve chamber 149. The pressure of fluid thus supplied to chamber 149 in addition to the pressure of spring 148 holds the inshot valve piston 145 seated in the position shown in the drawings. This maintains the inshot poppet valve 141 away from the seat rib 143 and as a result permits an unrestricted flow of fluid under pressure from passage 165 to passage 196 through which fluid under pressure is supplied to the brake cylinder 4 for applying the brakes. In all other respects the brake equipment operates in the same manner with high brake pipe pressure as when the brake pipe pressure is of the normal degree employed in long train service.

In controlling a train on a descending grade, it is customary to "cycle" or in other words to alternately effect an application of the brakes and then recharge the brake equipments while a partial release of the brakes is taking place through a retaining valve device. On a descending grade, the slack in a train is generally gathered against the locomotive at the front end of the train, so as in short train service, it is proposed to employ a high brake pipe pressure, so that when an emergency application of the brakes is effected, the inshot valve device is rendered ineffective to hold back the emergency build up of brake cylinder pressure. As a result, upon an emergency reduction in brake pipe pressure the brakes will be suddenly applied by a rapid increase in brake cylinder pressure effected in the same manner as in short train operation.

In cycling the brakes, the service application and releasing after a service application will however be slightly different from the normal operation hereinbefore described. The retaining valve device 5 is turned to the usual cut-in position, so that in releasing after the initial application of the brakes, which will be effected in the same manner as hereinbefore described, the retaining valve device 5 will close when the brake cylinder pressure is reduced to a predetermined degree, and thus bottle up a pressure in the brake cylinder 4 of for instance 20 pounds.

As described in connection with effecting a quick service reduction in brake pipe pressure, the quick service modifying valve diaphragm is deflected upwardly against spring 72 by a predetermined low pressure, of for instance 6 pounds, in the diaphragm chamber 62 and this permits the check valve 63 to seat, which prevents venting of fluid under pressure from the quick service reservoir 14 until after the pressure has reduced in the diaphragm chamber 62 sufficiently below the 6 pound value of spring 72 to permit said spring to unseat the check valve 63.

The quick service modifying valve diaphragm chamber 62 is open in release position of the triple valve slide valve 44 to the retaining valve passage 198 through cavity 207, port 208, choke 209, port 210, choke 211 and cavity 197 and in retarded release position port 210 connects directly to the retaining valve passage 198. Thus, as fluid at brake cylinder pressure in passage 198 is permitted to reduce through the retaining valve device 5, the pressure of fluid in the modifying valve diaphragm chamber 62 and the connecting passage 206 reduces at the same rate and when the retaining valve device closes, fluid at brake cylinder pressure is bottled in said diaphragm chamber 62 and passage 206, and this bottled pressure is sufficiently in excess of the value of the diaphragm spring 72 that the check valve 63 is retained seated by spring 66, so that no venting of fluid under pressure is permitted to occur from the quick service reservoir 14.

While the brake cylinder pressure is thus being reduced down to the setting of the retaining valve device, the brake pipe, auxiliary reservoir 1 and emergency reservoir 2 are recharging in the same manner as in releasing after a service application. When the brake equipments are thus recharged to the desired degree, a reduction in brake pipe pressure may be effected which causes the triple valve device to first move to quick service position, in which passage 100 from the brake pipe passage 38 is again connected to the quick service passage 206 through port 215 in the main slide valve 44, cavity 214 in the auxiliary slide valve 45 and port 208. This permits a quick service venting of fluid under pressure from the brake pipe to passage 206 and quick service modifying valve diaphragm chamber 62, but not to the quick service reservoir 14 which at this time is charged with fluid under pressure from the quick service action of the initial application of brakes.

The combined volume of passage 206 and diaphragm chamber 62 is such as to effect a sufficient but limited quick service reduction in brake pipe pressure to hasten the service action through a train, but the degree is less than upon the initial application when the quick service reservoir 14 is effective, for the reason that the additional quick service reduction which would be effected by said reservoir would cause too great an aditional application of the brakes and thus to a certain extent, take away from the engineer the control of the degree of reapplication.

After the quick service reduction in brake pipe pressure is effected, the triple valve moves to service position, in which the passage 100 is connected to passage 206 through port 218, choke 217 and port 216 through which brake pipe pressure may gradually equalize from the brake pipe into the passage 206 and quick service modifying valve diaphragm chamber 62. In service position fluid under pressure is also supplied from the auxiliary reservoir 1 to the brake cylinder 4 and builds up on the retained pressure in the brake cylinder, thereby increasing the degree of brake cylinder pressure for slowing down the train. When desired, another partial release of the brakes and a recharge of the brake equipment may be effected and then followed by another application of the brakes, and this alternate operation may be continued as long as desired, after which a complete release of the brakes may be effected by turning down the retaining valve device to cut-out position and a full recharge of the brake equipment may be obtained in the same manner as in releasing after a service application.

It is apparent that in order to vent fluid under pressure from the quick service chamber 14, quick service modifying valve diaphragm chamber 62 and passage 206 when releasing the brakes, that the connection through port 208, choke 209 and port 210 in the main slide valve 44 to the retaining valve passage 198 is provided in full release position of the triple valve device and in retarded release position of said triple valve device port 210 is connected through the retarded release choke 211 to passage 198. As a result, the release of fluid from the quick service chamber is retarded either by choke 209 by itself or by chokes 209 and 211 in series, but this slow venting has no operative effect, and in so far as such venting is concerned both chokes could be omitted, but these chokes are provided for other purposes. The object of the retarded release choke 211 has been hereinbefore specified, but the purpose of choke 209 is to prevent any appreciable venting of fluid under pressure from the brake pipe to the retaining valve pipe 198 and from thence to the atmosphere when the triple valve device moves to quick service position and supplies fluid at brake pipe pressure from passage 100 through cavity 214 to the quick service port 206.

The choke 194 is provided to limit the rate at which fluid under pressure can flow to the emergency slide valve loading diaphragm chamber 121, so that if the diaphragm 120 should become ruptured and establish communication from the emergency reservoir 2 to the emergency slide valve chamber 101, and a service application of the brakes is then effected, the service port 221 through the auxiliary slide valve 104 and port 222 in the main slide valve 103 will be able to reduce the pressure in said valve chamber at a rate sufficiently fast to prevent obtaining a differential on the emergency piston 98 of a degree which would move it to emergency position and thus cause an undesired emergency application of the brakes to be effected.

At certain times it may be desired to vent fluid under pressure from the auxiliary reservoir 1 and emergency reservoir 2 and for this purpose the reservoir release valve device 74, which is covered in my patents, Nos. 2,012,717 and 2,012,718, issued August 27, 1935 is provided. By moving the operating lever 97 of said device in either direction, the sliding pin 88 is pushed downwardly against the pressure of spring 91 and carries with it the member 90 which first engages the auxiliary reservoir release valve stem 80, and upon further movement unseats said valve and engages the emergency reservoir release valve stem 87 so that still further movement will unseat the valve 83. If it is desired to vent fluid under pressure only from the auxiliary reservoir 1 the member 90 is only moved sufficiently to unseat the auxiliary reservoir release valve 75 which permits fluid under pressure to flow from the valve chamber 42 and connected auxiliary reservoir 1 to chamber 81, which is open to the atmosphere. If it is desired to vent fluid under pressure from both of said reservoirs, the member 90 is moved downwardly sufficiently to unseat the emergency reservoir release valve 83, as well as the auxiliary reservoir release valve 75, and this permits fluid under pressure to flow from the emergency reservoir 2 through pipe 187, passage 186 and past the release valve 83 to the atmosphere through chamber 81, at the same time as fluid under pressure is released from the auxiliary reservoir 1 through the valve chamber 42 and past the release valve 75.

Certain features shown and described in this application are the invention of Clyde C. Farmer and are claimed in an application of Clyde C. Farmer, Serial No. 612,465, filed May 20, 1932.

While one illustrative embodiment of the invention has been described in detail, it is not my intention to limit its scope to that embodiment or otherwise than by the terms of the appended claims.

Having now described my invention, what I claim as new and desire to secure by Letters Patent, is:—

1. In a fluid pressure brake, the combination with a brake cylinder and a normally open valve, of a triple valve device and an emergency valve device operated in effecting an emergency application of the brakes for supplying fluid under pressure to said brake cylinder past said open valve, movable means normally holding said valve open and operating upon an increase in brake cylinder pressure for permitting said valve to close and means for subjecting said movable means to brake cylinder pressure in a direction to oppose the movement of said movable means to permit said valve to close.

2. In a fluid pressure brake, the combination with a brake cylinder, and a normally open valve, of a triple valve device operative in effecting a service application of the brakes to supply fluid under pressure past said open valve to said brake cylinder, an emergency valve device, said triple valve device and said emergency valve device being both operative in effecting an emergency application of the brakes to supply fluid under pressure past said open valve to said brake cylinder, means operated upon an increase in brake cylinder pressure for permitting the closing of said valve in effecting an emergency application of the brakes, said emergency valve device establishing communication through which fluid under pressure is supplied to said means, in effecting a service application of the brakes, to oppose the closing movement of said valve.

3. In a fluid pressure brake, the combination with a brake cylinder, and a normally open valve, of a triple valve device operative in effecting a service application of the brakes to supply fluid under pressure past said open valve to said brake cylinder, an emergency valve device, said triple valve device and said emergency valve device being both operative in effecting an emergency application of the brakes to supply fluid under pressure past said open valve to said brake cylinder, means operated upon an increase in brake cylinder pressure for closing said valve in effecting an emergency application of the brakes, the closing movement of said valve being opposed by brake cylinder pressure previously supplied to said brake cylinder in effecting a service application of the brakes.

4. In a fluid pressure brake, the combination with a brake cylinder, and a normally open valve, of valve means operated in effecting an emergency application of the brakes for supplying fluid under pressure past said valve to said brake cylinder, movable means normally holding said valve open and operating upon an increase in brake cylinder pressure for permitting said valve to close, means for subjecting said movable means to brake cylinder pressure in a direction to oppose the movement of said movable means to permit said valve to close, and means for controlling the supply of fluid under pressure from said valve means to said brake cylinder after said valve is closed.

5. In a fluid pressure brake, the combination with a brake cylinder, a reservoir normally charged with fluid under pressure and a normally open valve, of valve means operated in effecting an emergency application of the brakes to supply fluid under pressure past said valve to said brake cylinder and to vent fluid under pressure from said reservoir, means operated upon an increase in brake cylinder pressure for closing said valve, a passage by-passing said valve for controlling the supply of fluid under pressure from said valve means to said brake cylinder upon the closing of said valve, and means operated in accordance with the pressures in said reservoir in opposition to the pressure in the brake cylinder and to the pressure of fluid supplied by said valve means, for supplying fluid under pressure directly from said valve means to said brake cylinder independent of said passage.

6. In a fluid pressure brake, the combination with a brake cylinder, a reservoir normally charged with fluid under pressure and a normally open valve, of valve means operated in effecting an emergency application of the brakes to supply fluid under pressure past said valve to said brake cylinder and to vent fluid under pressure from said reservoir, means operated upon an increase in brake cylinder pressure for closing said valve, a passage by-passing said valve for controlling the supply of fluid under pressure from said valve means to said brake cylinder upon the closing of said valve, and means operated in accordance with the reduction in pressure in said reservoir for supplying fluid under pressure directly from said valve means to said brake cylinder independent of said passage.

7. In a fluid pressure brake, the combination with a brake cylinder and a reservoir, of valve means operated in effecting an emergency application of the brakes for supplying fluid under pressure to said brake cylinder, means included in said valve means for restricting the rate of flow of fluid to the brake cylinder and for venting fluid under pressure from said reservoir, and a valve having one seated area normally subject to the pressure of fluid supplied by said valve means and another seated area normally subject to brake cylinder pressure, said valve being operative in accordance with the reduction in pressure in said reservoir to open direct communication from said valve means to said brake cylinder.

8. In a fluid pressure brake, the combination with a brake cylinder, of valve means operated in effecting an emergency application of the brakes to supply fluid under pressure to said brake cylinder, valve mechanism for at one time controlling the supply of fluid under pressure from said valve means to said brake cylinder and for varying the rate at which fluid under pressure is supplied from said valve means to said brake cylinder, and a valve device controlled by the pressure of fluid supplied by said valve means in effecting an application of the brakes and operated upon a predetermined increase in fluid pressure for rendering said valve mechanism ineffective to vary the rate at which fluid under pressure is supplied by said valve means to said brake cylinder.

9. In a fluid pressure brake, the combination with a brake cylinder and a reservoir normally charged with fluid under pressure, of valve means operative in effecting an emergency application of the brakes to supply fluid under pressure from said reservoir to said brake cylinder, valve mechanism for varying the rate at which fluid under pressure is supplied by said valve means to said brake cylinder, and a valve device operative by fluid under pressure from said reservoir for rendering said valve mechanism ineffective to vary the rate of flow of fluid to the brake cylinder.

10. In a fluid pressure brake, the combination with a brake cylinder and a reservoir normally charged with fluid under pressure, of valve means operative in effecting an emergency application of the brakes to supply fluid under pressure from said reservoir to said brake cylinder, valve mechanism for varying the rate at which fluid under pressure is supplied by said valve means to said brake cylinder, and a valve device operative by fluid under pressure from said reservoir for rendering said valve mechanism ineffective to vary the rate of flow of fluid to the brake cylinder, the supply of fluid under pressure from said reservoir to said valve device being controlled by said valve means.

11. In a fluid pressure brake, the combination with a brake cylinder and a reservoir normally charged with fluid under pressure, of valve means operative in effecting an emergency application of the brakes to supply fluid under pressure from said reservoir to said brake cylinder, valve mechanism for varying the rate at which fluid under pressure is supplied by said valve means to said brake cylinder, and a valve device for rendering said valve mechanism ineffective, said valve device comprising a spring, and an abutment movable against the opposing pressure of said spring by fluid under pressure supplied from said reservoir by said valve means, for establishing direct communication from said valve means to said brake cylinder.

12. In a fluid pressure brake, the combination with a brake pipe charged with fluid at a predetermined pressure, a brake cylinder and a reservoir normally charged with fluid at brake pipe pressure, of an emergency valve device operative upon a reduction in brake pipe pressure to establish a communication through which fluid under pressure is supplied from said reservoir to said brake cylinder, valve mechanism for varying the rate at which fluid flows from said communication to said brake cylinder, and a valve device operative by fluid under pressure from said reservoir when said brake pipe and reservoir are charged to a pressure greater than said predetermined pressure for rendering said valve mechanism ineffective to vary the rate of flow of fluid under pressure to said brake cylinder.

13. In a fluid pressure brake, the combination with a brake pipe, of a bracket to which said brake pipe is connected, and a triple valve device mounted on one side of said bracket and having a piston chamber adapted to be supplied with fluid under pressure from said brake pipe, an emergency valve device mounted on another side of said bracket and having a piston chamber adapted to be supplied with fluid under pressure from said brake pipe, said bracket having a chamber, means for connecting said chamber to each of said piston chambers, a passage connecting said chamber to said brake pipe, and means disposed in said chamber for filtering fluid under pressure supplied from the brake pipe through said passage to said means.

14. In a fluid pressure brake, the combination with a brake pipe, of a bracket to which said brake pipe is connected, and a triple valve device mounted on one side of said bracket and having a piston chamber adapted to be supplied with fluid under pressure from said brake pipe, an emergency valve device mounted on another side of said bracket and having a piston chamber adapted to be supplied with fluid under pressure from said brake pipe, said bracket having a quick service reservoir adapted to be supplied with fluid under pressure from the brake pipe upon operation of said triple valve device, a quick action chamber adapted to be supplied with fluid under pressure from the emergency piston chamber, and a cavity connected to said brake pipe and to said piston chambers, and means disposed in said cavity for filtering fluid under pressure supplied from said brake pipe to said chambers and quick service reservoir.

15. In a fluid pressure brake, the combination with a brake cylinder and brake pipe, of a normally open valve, a triple valve device and an emergency valve device operated upon a sudden reduction in brake pipe pressure for supplying fluid under pressure past said open valve to the brake cylinder, means operative upon a predetermined increase in brake cylinder pressure for closing said valve, and valve means controling a by-pass communication around said valve, through which fluid under pressure is supplied to the brake cylinder, the last mentioned valve means being subject to the pressure of a chamber adapted to be charged with fluid under pressure from the brake pipe.

16. In a fluid pressure brake, the combination with a brake cylinder and brake pipe, of a normally open valve, a triple valve device and an emergency valve device operated upon a sudden reduction in brake pipe pressure for supplying fluid under pressure past said open valve to the brake cylinder, means operative upon a predetermined increase in brake cylinder pressure for closing said valve, and valve means controlling a by-pass communication around said valve, through which fluid under pressure is supplied to the brake cylinder, the last mentioned valve means being subject to the opposing pressures of the brake cylinder and a chamber adapted to be charged with fluid under pressure from the brake pipe.

17. In a fluid pressure brake, the combination with a brake cylinder and brake pipe, of a normally open valve, a triple valve device and an emergency valve device operated upon a sudden reduction in brake pipe pressure for supplying fluid under pressure past said open valve to the brake cylinder, means operative upon a predetermined increase in brake cylinder pressure for closing said valve, and valve means controlling a by-pass communication around said valve, through which fluid under pressure is supplied to the brake cylinder, the last mentioned valve means being subject to the opposing pressures of the brake cylinder and a chamber adapted to be charged with fluid under pressure from the brake pipe, and means operating upon a sudden reduction in brake pipe pressure for venting fluid from said chamber at a restricted rate.

18. In a fluid pressure brake, the combination with a brake pipe and a brake cylinder, of valve means operated upon a reduction in brake pipe pressure to supply fluid under pressure to said brake cylinder, valve mechanism for at one time varying the rate of said supply, and means operative independently of said valve mechanism according to the pressure of said supply of fluid for rendering said valve mechanism either effective or ineffective to vary the rate of supply of fluid under pressure to said brake cylinder.

19. In a fluid pressure brake, the combination with a brake pipe and a brake cylinder, of valve means operated upon a reduction in brake pipe pressure to supply fluid under pressure to said brake cylinder, valve mechanism for at one time varying the rate of said supply, and means conditioned, upon the operation of said valve means upon a reduction in brake pipe pressure, to render said valve mechanism effective when the normal pressure carried in the brake pipe is of a certain degree and to render said valve mechanism ineffective when the normal pressure carried in said brake pipe is of a different degree.

20. In a fluid pressure brake, the combination with a brake pipe and a brake cylinder, of valve means having a release position and movable upon an emergency reduction in brake pipe pressure to an emergency position for supplying fluid under pressure to said brake cylinder to effect an emergency application of the brakes, of valve mechanism normally conditioned to vary the rate at which fluid is supplied by said valve means to said brake cylinder, and means operated by fluid under pressure supplied by said valve means in said emergency position to render said valve mechanism ineffective when the normal pressure carried in the brake pipe exceeds a predetermined degree.

21. In a fluid pressure brake, the combination with a brake pipe, of a bracket to which said brake pipe is connected, and a triple valve device mounted on one face of said bracket and having a piston chamber one end of which is formed by said bracket face, an emergency valve device mounted on another face of said bracket and having a piston chamber one end of which is formed by the bracket face, said piston chamber being adapted to be supplied with fluid under pressure from said brake pipe, said bracket having a chamber, means connecting the chamber in said bracket to said piston chambers, a passage connecting the chamber in said bracket to said brake pipe, and means disposed in the chamber in said bracket for filtering fluid under pressure supplied from the brake pipe through said passage to said means.

22. In a fluid pressure brake, the combination with a brake pipe and a brake cylinder, of a brake controlling valve mechanism operated upon a gradual reduction in brake pipe pressure for supplying fluid under pressure to the brake cylinder to effect a service application of the brakes and operated upon a sudden reduction in brake pipe pressure for supplying fluid under pressure to the brake cylinder to effect an emergency application of the brakes, said brake controlling valve mechanism comprising a triple valve device and an emergency valve device, an inshot valve device for controlling a communication through which fluid under pressure is supplied to the brake cylinder in effecting both a service and an emergency application of the brakes, said inshot valve device being responsive to a predetermined brake cylinder pressure in effecting an emergency application for closing said communication and being unresponsive to brake cylinder pressure to close said communication in effecting a service application, and means included in said emergency valve device for conditioning said inshot valve device to be responsive or unresponsive to brake cylinder pressure to close said communication.

23. In a fluid pressure brake, the combination with a brake pipe and a brake cylinder, of a brake controlling valve mechanism operated upon a gradual reduction in brake pipe pressure for supplying fluid under pressure to the brake cylinder to effect a service application of the brakes and operated upon a sudden reduction in brake pipe pressure for supplying fluid under pressure to the brake cylinder to effect an emergency application of the brakes, said brake controlling valve mechanism comprising a triple valve device and an emergency valve device, an inshot valve device for controlling a communication through which fluid under pressure is supplied to the brake cylinder in effecting both a service and an emergency application of the brakes, said inshot valve device being responsive to a predetermined brake cylinder pressure in effecting an emergency application for closing said communication and being unresponsive to brake cylinder pressure to close said communication in effecting a service application, and means included in said emergency valve device for subjecting said inshot valve device to fluid pressure in effecting a service application of the brakes for rendering the inshot valve device unresponsive to brake cylinder pressure to close said communication.

24. In a fluid pressure brake, the combination with a brake pipe and a brake cylinder, of a brake controlling valve mechanism operated upon a gradual reduction in brake pipe pressure for supplying fluid under pressure to the brake cylinder to effect a service application of the brakes and operated upon a sudden reduction in brake pipe pressure for supplying fluid under pressure to the brake cylinder to effect an emergency application of the brakes, said brake controlling valve mechanism comprising a triple valve device and an emergency valve device, an inshot valve device for controlling a communication through which fluid under pressure is supplied to the brake cylinder in effecting both a service and an emergency application of the brakes, said inshot valve device being responsive to a predetermined brake cylinder pressure in effecting an emergency application for closing said communication and being unresponsive to brake cylinder pressure to close said communication in effecting a service application, and means included in said emergency valve device for subjecting said inshot valve device to fluid at brake cylinder pressure in effecting a service application of the brakes for rendering the inshot valve device unresponsive to brake cylinder pressure to close said communication.

25. In a fluid pressure brake, the combination with a brake pipe, of a valve device comprising a casing, a valve in said casing operable to vent fluid under pressure from the brake pipe, a cylinder formed in said casing, a piston in said cylinder for actuating said valve to vent fluid under pressure from the brake pipe, said piston having a normal position in which said valve is closed, said casing having a leakage groove formed therein and establishing communication from one side of said piston to the other when said piston is in the normal position, a gasket mounted on said casing, and means operated upon a sudden reduction in brake pipe pressure for supplying fluid under pressure to said cylinder to actuate said piston to close said leakage groove and to open said valve and to then engage said gasket to prevent fluid which may leak from said cylinder past the periphery of said piston from flowing to the atmosphere.

26. In a fluid pressure brake, the combination with a brake pipe, of a vent valve device operable by fluid under pressure to vent fluid under pressure from the brake pipe, said vent valve device comprising a casing, a valve in said casing operable to vent fluid under pressure from the brake pipe, a piston mounted in said casing having a pressure side and a non-pressure side, a gasket mounted on said casing at the non-pressure side of said piston, said piston having a normal position in which said valve is closed and the pressure side of the piston is open to the non-pressure side through a leakage groove formed in the casing and operable by fluid under pressure supplied to the pressure side of the piston for closing said leakage groove and for actuating said valve to vent fluid under pressure from the brake pipe and for seating against said gasket to prevent leakage of fluid from the pressure side of the piston, and means operable upon a sudden reduction in brake pipe pressure for supplying fluid under pressure to the pressure side of said piston.

27. In a fluid pressure brake, the combination with a brake pipe, an auxiliary reservoir and a brake cylinder, of a triple valve device comprising a main slide valve, a graduating valve and a piston for operating said valves, said triple valve device having an inner and an outer release position, a communication through which fluid is supplied from the brake pipe to the auxiliary reservoir at a restricted rate in both release positions of the triple valve device, means for loading the main valve in the outer release position, and means operative upon movement of the main valve to the inner release position for reducing the loading of the main valve.

28. In a fluid pressure brake, the combination with a brake pipe, a brake cylinder, a chamber and means for charging said chamber with fluid under pressure from the brake pipe, of means operated upon an emergency reduction in brake pipe pressure for venting fluid from said chamber at a restricted rate, and means constantly subject to the opposing pressures of said chamber and brake cylinder and operative upon a reduction in pressure in said chamber for opening a communication through which fluid under pressure is supplied to the brake cylinder.

29. In a fluid pressure brake, the combination with a brake pipe, a brake cylinder, a chamber and means for charging said chamber with fluid under pressure from the brake pipe, of means operated upon an emergency reduction in brake pipe pressure for venting fluid from said chamber at a restricted rate, and means constantly subject to the opposing pressures of the chamber and brake cylinder and responsive to a reduction in pressure in said chamber and an increase in brake cylinder pressure for opening a communication through which fluid under pressure is supplied to the brake cylinder.

30. In a fluid pressure brake, the combination with a brake cylinder, a chamber, means for charging said chamber with fluid under pressure from the brake pipe, and a normally open valve, of a valve mechanism operated upon an emergency reduction in brake pipe pressure for supplying fluid under pressure past said valve to the brake cylinder and for venting fluid under pressure from said chamber, means operated upon an increase in brake cylinder pressure for closing said valve, means for restricting the rate of flow of fluid to the brake cylinder when the valve is closed, and valve means constantly subject to the opposing pressures of the chamber and brake cylinder and operative upon a reduction in the pressure in said chamber for opening a communication through which fluid under pressure is also supplied to the brake cylinder to increase the rate of flow of fluid to the brake cylinder.

31. In a fluid pressure brake, the combination with a brake cylinder, a chamber, means for charging said chamber with fluid under pressure from the brake pipe, and a normally open valve, of a valve mechanism operated upon an emergency reduction in brake pipe pressure for supplying fluid under pressure past said valve to the brake cylinder and for venting fluid under pressure from said chamber, means operated upon an increase in brake cylinder pressure for closing said valve, means for restricting the rate of flow of fluid to the brake cylinder when the valve is closed, and means constantly subject to the opposing pressures of the chamber and brake cylinder and responsive to a reduction in pressure in said chamber and an increase in brake cylinder pressure for opening a communication through which fluid under pressure is supplied to the brake cylinder to increase the rate of flow of fluid to the brake cylinder.

32. In a fluid pressure brake, the combination with a brake pipe, of a triple valve device comprising a piston, and a main valve operated by said piston and having a normal release position and an application position, said valve having a cavity which is connected to the atmosphere in the normal release position and which is supplied with fluid under pressure from the brake pipe in application position.

33. In a fluid pressure brake, the combination with a brake pipe, of a triple valve device comprising a piston, and a main valve operated by said piston and having a normal release position, an inner release position and an application position, said valve having a cavity connected to the atmosphere in normal release position and being supplied with fluid under pressure in said inner release position and in application position.

34. In a fluid pressure brake, the combination with a brake pipe, of a triple valve device comprising a piston, and a main valve operated by said piston and having a normal release position, an inner release position and an application position, said valve having a cavity connected to the atmosphere in normal release position and being supplied with fluid under pressure from the brake pipe in application position and with the fluid under pressure from another fluid pressure supply source in said inner release position.

35. In a fluid pressure brake, the combination with a brake pipe, a brake cylinder, and a brake controlling valve mechanism including service and emergency portions, of two valve devices each responsive to brake cylinder pressure and to an opposing pressure, the first of said valve devices being normally open and in series relation between said brake controlling valve mechanism and said brake cylinder and the second of said valve devices being normally closed and in series relation between said emergency portion and said brake cylinder and in by-pass relation to said first valve device, said first valve device being adapted to be closed by a predetermined rise in brake cylinder pressure and second valve device being adapted to be opened by a brake cylinder pressure higher than said predetermined rise.

36. In combination, a brake pipe, an emergency reservoir, a quick action chamber, an emergency valve mechanism movable between application position and release position and subject to the opposing pressures of brake pipe and quick action chamber, a restricted charging port providing communication from the brake pipe to the quick action chamber in release position of the emergency valve mechanism, and a uni-directional communication from the quick action chamber to the emergency reservoir permitting the flow of fluid from the quick action chamber to the emergency reservoir whenever the pressure of fluid in the quick action chamber exceeds that in the emergency reservoir, whereby overcharging of the quick action chamber is minimized by flow from said chamber to said reservoir.

37. In combination, a brake pipe, an emergency reservoir, a quick action chamber, an emergency valve mechanism movable between application position and to either one of two release positions and subject to the opposing pressures of brake pipe and quick action chamber, a restricted charging port providing communication from the brake pipe to the quick action chamber in either release position of the emergency valve mechanism, and a uni-directional communication from the quick action chamber to the emergency reservoir permitting the flow of fluid from the quick action chamber to the emergency reservoir whenever the pressure of fluid in the quick action chamber exceeds that in the emergency reservoir, whereby overcharging of the quick action chamber is minimized by flow from said chamber to said reservoir.

38. A triple valve device comprising a piston, a main valve operated by said piston and having a normal release position and an inner position, yielding resistance means for opposing movement of said valve from normal release position to the inner position, and a cavity in said valve which is brought into communication with fluid under pressure upon movement of the valve to said inner position for reducing the resistance of the valve to movement from the inner position to said release position by said yielding resistance means.

ELLIS E. HEWITT.